US010706563B2

(12) United States Patent
Kushleyev et al.

(10) Patent No.: US 10,706,563 B2
(45) Date of Patent: Jul. 7, 2020

(54) STATE AND POSITION PREDICTION OF OBSERVED VEHICLES USING OPTICAL TRACKING OF WHEEL ROTATION

(71) Applicant: QUALCOMM Incorporated, San Diego, CA (US)

(72) Inventors: Aleksandr Kushleyev, Philadelphia, PA (US); Stephen Marc Chaves, Philadelphia, PA (US); Matthew Hyatt Turpin, Philadelphia, PA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 15/980,300

(22) Filed: May 15, 2018

(65) Prior Publication Data

US 2019/0355132 A1 Nov. 21, 2019

(51) Int. Cl.
*G06T 7/246* (2017.01)
*G06T 7/62* (2017.01)
(Continued)

(52) U.S. Cl.
CPC .......... *G06T 7/248* (2017.01); *G06K 9/00791* (2013.01); *G06T 7/62* (2017.01);
(Continued)

(58) Field of Classification Search
CPC .......... G06K 9/00798; G06K 9/00832; G06K 9/00818; G06K 9/46; G06K 9/6256;
(Continued)

(56) References Cited

U.S. PATENT DOCUMENTS 5,793,492 A * 8/1998 Vanaki ................. G01B 11/245
356/608
7,623,680 B2 11/2009 Takahama et al.
(Continued)

FOREIGN PATENT DOCUMENTS

WO 2013083343 A1 6/2013

OTHER PUBLICATIONS

International Search Report and Written Opinion—PCT/US2019/031061—ISA/EPO—dated Aug. 28, 2019.
(Continued)

*Primary Examiner* — Aklilu K Woldemariam
(74) *Attorney, Agent, or Firm* — QUALCOMM Incorporated

(57) ABSTRACT

Various embodiments may include methods of using image data to estimate motion of a vehicle observed within camera images, such as images captured by a vehicle navigation system of a host vehicle. Various embodiments may include a camera capturing a sequence of images including the observed vehicle, and a processor performing image processing to identify a wheel of the observed vehicle, and determining a rate of rotation of the wheel based on changes in orientation of the wheel between at least two images within the sequence of images. The processor may further determine a speed of the observed vehicle based on the wheel's rate of rotation and diameter. The processor may further determine a direction of travel and/or turning rate of the observed vehicle by determining relative angles of wheels of the observed vehicle in at least one image.

26 Claims, 12 Drawing Sheets

(51) Int. Cl.
*G06T 7/73* (2017.01)
*G06K 9/00* (2006.01)
*G01C 21/36* (2006.01)

(52) U.S. Cl.
CPC ............ *G06T 7/74* (2017.01); *G01C 21/3602* (2013.01); *G06K 2209/23* (2013.01); *G06T 2207/10016* (2013.01); *G06T 2207/30252* (2013.01)

(58) Field of Classification Search
CPC .......... G06K 2209/19; G06K 2209/23; G06K 9/3208; G06K 9/6289; G06K 9/00664; G06K 9/00791; G06K 9/00812; G06K 9/60; G08G 1/0104; G08G 1/052; G08G 1/20; G08G 1/00; G08G 1/01; G08G 1/207; G08G 1/015; G08G 1/042; B60W 2420/42; B60W 30/12; B60W 30/165; B60W 2550/10; B60W 30/09; G01C 21/28; G01C 21/36; G01C 21/3476; G01C 21/16; G01C 21/3602; G01S 19/51; G01S 19/53; G01S 5/0268; G01S 5/14; G01S 5/00; G06F 16/29; G06F 17/10; B62D 15/025; B62D 15/0265; B62D 13/06; G07C 5/008; B60T 7/12; B62B 3/14; B62B 5/0423; B62B 5/0404; G01P 3/48; G01P 15/08; G05D 1/0274; G05D 2201/0213; G05D 1/0246; G05D 1/0255; G05D 1/0276; G05D 1/0219; G05D 1/0088; G06T 2207/30241; G06T 2207/30252; G06T 7/73; G06T 7/74; G06T 2207/10012; G06T 7/248; G06T 7/285; G06T 7/62; G06T 7/97; G06T 7/20; G06T 7/246; G06T 2200/04; G06T 2207/10016; G06T 2207/10028; G08B 13/1436; G08B 21/0261; G01N 29/265; G05B 19/041; B61L 27/0094; B61L 23/047; H04N 7/181; H04N 5/23238; B61K 9/04; B61K 9/08; B61K 9/12; G01B 11/10; G01B 11/245; G01B 2210/20; G01B 2210/286; A47L 11/40; A47L 9/2884; B60B 33/0039; B60D 1/36; B60D 1/62
USPC ........ 382/104; 348/36, 148, 149; 701/29, 41
See application file for complete search history.

(56) References Cited

U.S. PATENT DOCUMENTS

| | | | | |
|---|---|---|---|---|
| 8,239,992 | B2* | 8/2012 | Schnittman | A47L 11/4061 15/41.1 |
| 8,331,621 | B1* | 12/2012 | Allen | G08G 1/042 235/384 |
| 8,670,866 | B2* | 3/2014 | Ziegler | A47L 5/14 700/245 |
| 8,694,195 | B2 | 4/2014 | Lee et al. | |
| 9,152,915 | B1* | 10/2015 | Gabardos | G06N 3/02 |
| 9,187,091 | B2 | 11/2015 | Mills | |
| 2002/0159270 | A1* | 10/2002 | Lynam | B60R 1/00 362/492 |
| 2007/0016328 | A1* | 1/2007 | Ziegler | A47L 7/0042 700/245 |
| 2007/0211145 | A1* | 9/2007 | Kilian | B61K 9/12 348/148 |
| 2009/0174778 | A1* | 7/2009 | Allen | G08G 1/042 348/149 |
| 2009/0189783 | A1* | 7/2009 | Koitabashi | G06T 7/579 340/937 |
| 2009/0319114 | A1* | 12/2009 | Takenaka | B60W 10/18 701/48 |
| 2010/0141736 | A1* | 6/2010 | Hack | G01C 22/02 348/36 |
| 2011/0144850 | A1* | 6/2011 | Jikihara | G05D 1/0242 701/26 |
| 2012/0022739 | A1* | 1/2012 | Zeng | B60W 30/165 701/536 |
| 2012/0062747 | A1* | 3/2012 | Zeng | G06K 9/00798 348/149 |
| 2014/0035725 | A1* | 2/2014 | Bruemmer | G05D 1/0274 340/8.1 |
| 2014/0052293 | A1* | 2/2014 | Bruemmer | G01C 21/00 700/248 |
| 2014/0132740 | A1* | 5/2014 | Clark | G01B 11/245 348/48 |
| 2014/0241584 | A1* | 8/2014 | Elwart | G06K 9/3258 382/104 |
| 2016/0009318 | A1* | 1/2016 | Morotomi | B62D 15/025 701/41 |
| 2016/0297432 | A1* | 10/2016 | Fletcher | B62D 15/0265 |
| 2017/0066464 | A1* | 3/2017 | Carter | B60T 7/18 |
| 2017/0371344 | A1* | 12/2017 | Cohen | G06T 7/269 |

OTHER PUBLICATIONS

Lai, C-C., et al., "Estimation of Moving Vehicle Locations using Wheel Shape Information in Single 2-D Lateral Vehicle Images by 3-D Computer Vision Techniques", Robotics and Computer Integrated Manufacturing, Elsevier Science Publishers BV., Barking, GB, vol. 15, No. 2, Apr. 1, 1999 (Apr. 1, 1999), pp. 111-120, XP004168773, ISSN: 0736-5845. DOI: 10.1016/S0736-5845(99)00006-X.

Lai C-C., et al., "Location Estimation and Trajectory Prediction of Moving Lateral Vehicle using Two Wheel Shapes Information in 2-D Lateral Vehicle Images by 3-D Computer Vision Techniques", Proceedings / 2003 IEEE International Conference on Robotics and Automation, The Grand Hotel, Taipei, Taiwan; [Proceedings of the IEEE International Conference on Robotics and Automation], IEEE Service Center, Piscataway, NJ, vol. 1, (Sep. 14, 2003), pp. 881-886, XP010666915, DOI: 10.1109/ROBOT.2003.1241704, ISBN: 978-0-7803-7736-3.

* cited by examiner

STATE AND POSITION PREDICTION OF OBSERVED VEHICLES USING OPTICAL TRACKING OF WHEEL ROTATION

BACKGROUND

Automobiles and trucks are becoming more intelligent as the industry moves towards deploying autonomous and semi-autonomous vehicles. Autonomous and semi-autonomous vehicles can detect information about their location and surroundings (for example, using radar, lidar, GPS, file odometers, accelerometers, cameras, and other sensors), and include control systems that interpret sensory information to identify hazards and determine navigation paths to follow. Autonomous and semi-autonomous vehicles include control systems to operate with limited or no control from an occupant or other operator of the automobile. Safe operation of autonomous and semi-autonomous vehicles depends upon early and accurate identification of obstacles and tracking and predicting the movement of other vehicles, all in the dynamic and busy environment of streets and highways.

SUMMARY

Various embodiments and embodiments include methods for improving state and intention prediction of observed cars with optical tracking of wheel rotation.

Various embodiments include methods that may be implemented in a processor of a vehicle, such as a vehicle navigation system for an autonomous or semiautonomous vehicle or vehicle safety system, for using image data to estimate motion of an observed vehicle. Various embodiments may include receiving a sequence of images captured by a camera, performing image processing to identify a wheel of an observed vehicle within the sequence of images, and determining a rate of rotation of the wheel based on changes in orientation of the wheel between at least two images within the sequence of images s.

In some embodiment, determining the rate of rotation of the wheel based on changes in orientation of the wheel between at least two images within the sequence of images may include performing image processing to identify a feature of the wheel present in a first image of the wheel and a second image of the wheel, performing image processing to identify a center of the wheel in each of the first and second images of the wheel, determining an amount of positional change of the identified feature of the wheel between the first and second images of the wheel, determining an angle of rotation of the identified feature of the wheel between the first and second images of the wheel based on the amount of positional change of the identified feature of the wheel between the first and second images of the wheel and the center of the wheel in each of the first and second images of the wheel, determining an amount of time elapsed between the first image and the second image, and determining the rate of rotation of the wheel based on the determining an angle of rotation of the identified feature and the amount of time elapsed between the first and second images of the wheel.

Some embodiments may further include performing image processing of the sequence of images to determining a diameter of the wheel, and determining a speed of the observed vehicle based on the determined rate of rotation of the wheel and the diameter of the wheel. Such embodiments may further include augmenting information available to a vehicle navigation system of a host vehicle using the determined speed of the observed vehicle.

Some embodiments may further include determining a direction of travel of the observed vehicle based on image processing of the wheel within the sequence of images. In such embodiments, determining a direction of travel of the observed vehicle based on image processing of the wheel within the sequence of images may include performing image processing of at least one image to determining an observed horizontal diameter of the wheel, performing image processing of at least one image to determining an observed vertical diameter of the wheel, calculating a ratio of the observed horizontal diameter to the observed vertical diameter, determining a viewing angle to the wheel from a camera capturing the sequence of images, and determining a relative angle of the wheel with respect to the camera based upon the ratio of the observed horizontal diameter to the observed vertical diameter and the determined viewing angle to the wheel from the camera. Such embodiments may further include augmenting a vehicle navigation system of a host vehicle using the determined direction of travel of the observed vehicle.

Some embodiments may further include determining whether the observed vehicle is turning based on image processing of a front wheel and a rear wheel of the observed vehicle within the sequence of images.

Some embodiments may further include determining an angle of turn of the observed vehicle based on image processing of a front wheel and a rear wheel of the observed vehicle within the sequence of images. In such embodiments, performing image processing to identify the wheel of the observed vehicle within the sequence of images may include performing image processing of at least one image to identify the front wheel and the rear wheel of the observed vehicle, such embodiments may further include image processing of at least one image to determine a relative angle of the front wheel with respect to a camera capturing the at least one image, image processing of at least one image to determine a relative angle of the rear wheel with respect to the camera, image processing of the at least one image to determine a distance between the front wheel and the rear wheel, and determining a rate of turn of the observed vehicle based on the distance between the front wheel and the rear wheel, a linear speed of the observed vehicle based on the determined rate of rotation, and a difference between the relative angle of the front wheel and the relative angle of the rear wheel. Such embodiments may further include augmenting information available to a vehicle navigation system of a host vehicle using the determining angle of turn of the observed vehicle.

Further embodiments include a vehicle including an image sensor and a processor coupled to the image sensor and configured with processor-executable instructions to perform operations of any of the embodiment methods summarized above. A processing device for use in a vehicle and configured to perform operations of any of the embodiment methods summarized above. Further embodiments include a non-transitory processor-readable storage medium having stored thereon processor-executable software instructions configured to cause a processor to perform operations of any of the embodiment methods summarized above. Further embodiments include a vehicle that includes means for performing functions of any of the embodiment methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1A:
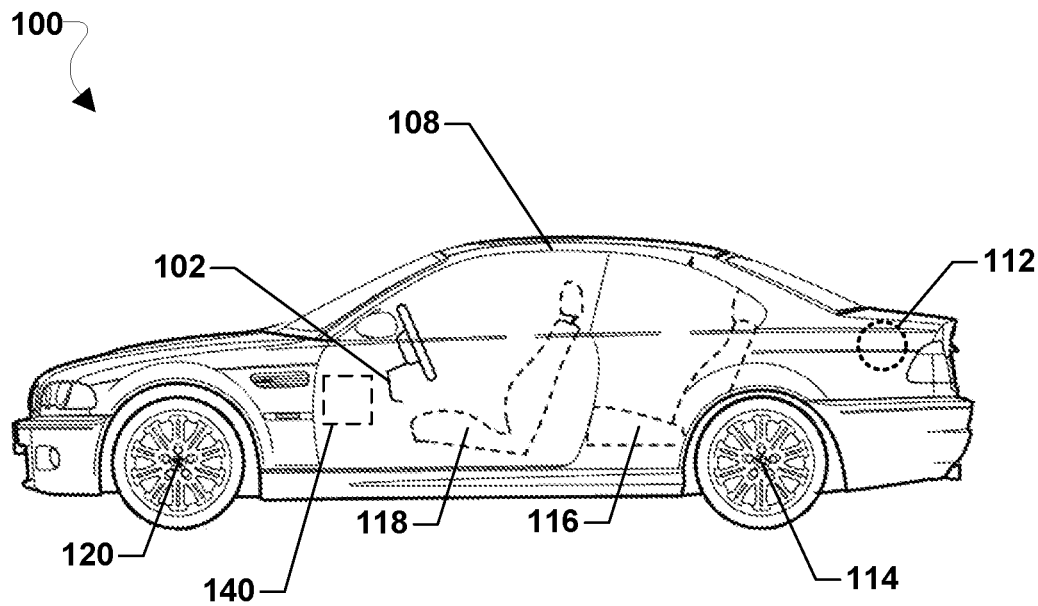
FIGS. 1A and 1B are component block diagrams illustrating a vehicle suitable for implementing various embodiments.

Various aspects will be described in detail with reference to the accompanying drawings. Wherever possible, the same reference numbers will be used throughout the drawings to refer to the same or like parts. References made to particular examples and embodiments are for illustrative purposes and are not intended to limit the scope of the various aspects or the claims.

Various embodiments include methods, vehicles implementing the methods and processing devices for use in vehicles that are configure to implement the methods for predicting a future position of an observed vehicle by processing images to determine the rotation and orientation of one or more wheels. Various embodiments may improve the operation of autonomous and semi-autonomous vehicles by providing improved motion estimates of slow speed vehicles by analyzing wheel rotation rates and orientation. For ease of reference, the term "host vehicle" is used to refer to a vehicle implementing various embodiments, while terms such as "other vehicle," "another vehicle" and "observed vehicle" are used to refer to vehicles that the host vehicle observes and tracks using various embodiments.

Autonomous and semi-autonomous vehicles, such as cars and trucks, are becoming a reality on city streets. Autonomous and semi-autonomous vehicles typically include a plurality of sensors, including cameras, radar, and lidar, that collect information about the environment surrounding the host vehicle. Such collected information may enable the host vehicle to recognize the roadway, identify objects to avoid, and track the movement and future position of other vehicles to enable partial or fully autonomous navigation. Even when operated by an occupant or other operator, such collected information may enable the host vehicle to facilitate and/or improve reaction(s) of the occupant or other operator. For example, collected information may be used to determine when the occupant or other operator should be prompted to apply the brakes.

While the plurality of sensors may be able to collect information about the host vehicle, the sensors may not be as effective in collecting information about other vehicles under certain circumstances. For example, radar may be effective at determining a velocity of an oncoming car based on Doppler shift and change of relative position over time, but radar may not be as effective at determining the velocity of a vehicle oriented perpendicular to the host vehicle (e.g., on a cross street at or in an intersection). As another example, an autonomous control system in the host vehicle may determine the movement and predict the future position of other vehicles by recognizing the motion of other vehicles within a sequence of camera images. However, the accuracy of such camera-based predictions can be limited when another vehicle oriented more or less perpendicular to the host vehicle is moving slowly, such as at an intersection. This is because the relative motion of a slow moving vehicle may be difficult for the host vehicle computing system to recognize from processing camera images when all stationary objects appear to be moving from image frame to image frame due to motion of the host vehicle.

Various embodiments improve the accuracy of tracking slow moving vehicles by analyzing the wheels of other vehicles because features on vehicle wheels will exhibit a larger displacement from one image frame to the next than will the other vehicle itself. An accurate estimate of vehicle speed can be calculated by the host vehicle processor determining the rotation rate of one or more wheels and estimating the wheel diameter. Additionally, the angular orientation of an observed vehicle can be determined based on wheel images by computing a ratio of major axes of a wheel (e.g., a ratio of the vertical diameter to the horizontal diameter), thereby providing more information that can be useful in predicting the future positions of the observed vehicle. In some embodiments, algorithms for fitting an ellipse to image data may be used in determining the angular orientation of an observed wheel.

Various embodiments provide systems and methods of predicting a future position of another vehicle by using camera image processing to recognize the wheels of other vehicles and estimate the movement of the other vehicles by measuring wheel rotation rate and wheel diameter. In various embodiments, a processor of an autonomous or semi-autonomous vehicle (i.e., the host vehicle) may receive a sequence of images captured by an image sensor, such as a digital camera, and process the sequence of images to identify the presence of one or more other vehicles. For example, a camera of the host vehicle may capture a sequence of images as the other vehicle approaches an intersection and process the images to determine whether another vehicle is located in or near the cross-street. Although the examples described herein refer to a single camera, this is only for simplicity and the sequence of images may include images captured by multiple cameras, thereby providing multiple viewing angles.

In various embodiments, the host vehicle processor may perform image processing on the sequence of captured images to identify at least one wheel of the other vehicle. Such image processing may include rectifying one or more images and compensating for any rolling shutter effect due to relative motion of the host vehicle and any other vehicles during the time that a single image frame is captured. The processor may further process images to identify and track one or more recognizable features in identified wheel(s) and track the position of such features across two or more images to determine a rate of rotation of the wheel(s). The processor may determine the rate of rotation based on the angle of rotation of the one or more features of the identified wheel from one image frame to the next and the time between image frames. For example, the processor may identify a marking (e.g., a character, a tread pattern, a coloring, etc.) or other aspect (e.g., an imperfection) of the identified wheel in a first image and a second image from the sequence of images and determine an amount of positional change of the identified feature of the wheel between the two images. For example, the processor may determine an amount of time elapsed between the first and second images based upon the image frame rate and/or a time at which each image is captured. The processor may calculate the rotation rate of the identified wheel by determining the angular motion of the one or more identified features based on the positional change of the identified features and dividing the angular movement by the elapsed time between the first and second images.

In various embodiments, the processor of the host vehicle may estimate a speed of other vehicles using the determined rotation rate of one or more wheels and an estimate of the wheel diameter as the other vehicle will advance by the wheel's circumference with each rotation and the circumference is equal to pi times the diameter. Wheel diameter may be estimated by the processor based upon the observed diameter within the image (e.g., the number of pixels spanning the wheel diameter) and a distance to the other vehicle, which may be provided by radar and/or lidar sensors. Even if an estimate of wheel diameter cannot be calculated directly, an estimate based on a standard wheel diameter may provide a more accurate estimate of a slow-moving vehicle's speed using various embodiment methods than estimating speed based upon the relatively small shift in position of the other vehicle body from one image to the next.

In various embodiments, the processor may process images of an identified wheel(s) to determine an angular orientation of the wheel with respect to the host vehicle, and thus the direction of travel of the wheel with respect to the host vehicle. In some embodiments, the processor may calculate or estimate a ratio of the major ellipsoidal axes of an identified wheel(s) to determine the angular orientation of the wheel with respect to the host vehicle. For example, the processor may calculate or estimate a horizontal diameter and a vertical diameter of the identified wheel(s), and use the two values to calculate a ratio of the horizontal diameter to the vertical diameter. The angle of the wheel relative to the host vehicle can then be calculated based upon the bearing angle of the other vehicle and the ratio of the horizontal diameter to vertical diameter of an identified wheel.

In some embodiments, the host vehicle processor may estimate a direction of travel of the other vehicle based on the calculated dimensional ratio of the identified wheel(s) in combination with the bearing angle to the other vehicle. As a simple example, if the calculated dimensional ratio of the identified wheel(s) is 1 (i.e., the calculated horizontal diameter equals the calculated vertical diameter) and the other vehicle is directly in front of the host vehicle, the identified wheel(s) is oriented perpendicular to the host vehicle and the processor may estimate that the other vehicle is traveling in a direction perpendicular to the host vehicle. As another simple example, if the calculated dimensional ratio of the identified wheel is 1 and the other vehicle is positioned at a bearing angle greater than 0, the processor may estimate that the other vehicle is traveling in a direction perpendicular to the bearing angle between the host vehicle and the other vehicle.

In some embodiments, the host vehicle processor may determine that the other vehicle is making a turn and estimate an angle of the turn of the other vehicle based on the ratio of horizontal diameter to vertical diameter of the front wheel compared to the horizontal diameter to vertical diameter of the rear wheel. If the two wheel ratios are different, this indicates that the front wheel is turned, and thus the other vehicle will turn as it moves forward or backward. In some embodiments, the processor may determine an angle of a front wheel and of a rear wheel of the other vehicle based on the respective ratios of wheel horizontal diameter to vertical diameter, and calculate a difference between the angles of the front and rear wheels. Based on the calculated angular difference, the processor may determine whether the other vehicle is or will be traveling in a straight line or turning. For example, if there is no difference between the angle of the front wheel and the angle of rear wheel (i.e., calculated difference equals 0), then the processor may estimate that the other vehicle will travel in a straight line. As another example, if the angles of the front and rear wheels differ (i.e., the calculated difference is either greater than or less than 0), the processor may estimate that the other vehicle is or will be turning as it moves, and may estimate a radius of the turning arc based on the angular difference between the wheels.

In some embodiments, the processor may predict a future position of the other vehicle based on the estimated direction of travel, the estimated speed of travel, and the estimated angle of turn all determine based at least in part on processing images of the wheels of the other vehicle. For example, if the estimated speed of travel is zero, the processor may predict that the other vehicle will remain stopped and treat that other vehicle as a fixed object while determining a safe travel path.

In various embodiments, the host vehicle processor may utilize information on the direction of travel estimate, the speed of travel estimate, the angle of turn estimate, and/or the future position predictions of other vehicles to augment information available to a vehicle navigation system of an autonomous or semi-autonomous vehicle and/or collision avoidance system. For example, autonomous or semi-autonomous vehicle navigation systems use a variety of sensors (including cameras, radar and/or lidar) to accurately determine the location of the host vehicle within the roadway as well as to determine the positions and directions of travel of other vehicles. Using data from the various sensors, an autonomous or semi-autonomous vehicle navigation system determines the course to steer and the speed to maintain (or brake) to proceed safely through traffic. Locations and velocities of other vehicles may be determined by the autonomous or semi-autonomous vehicle navigation system based on changes in relative position of vehicles from one observation and analysis cycle to the next. Various embodiments employ another method of estimating the velocity of other vehicles, as well as predicting a turning radius of such vehicles, that may provide more accurate estimates of motions of slow moving vehicles. By adding the information on other vehicle motions obtained using various embodiments to the sensor information used by the autonomous or semi-autonomous vehicle navigation system, more accurate estimations of other vehicle positions may be obtained, thereby improving the safety of autonomous or semi-autonomous vehicle navigation. As another example, if the future position prediction of another vehicle obtained by various embodiments indicates that the other vehicle may be crossing the path of travel of the host vehicle, such a prediction may be utilized to augment a collision avoidance system that is configured to engage the brakes when a risk of collision is detected by other sensors. As another example, if analysis of camera data according to various embodiments determines that the direction of travel of the other vehicle is perpendicular to that of the host vehicle, the estimated speed of travel is 3 M.P.H., and the estimated angle of turn is zero, the processor may predict that the other vehicle will be entering an intersection or otherwise crossing the path of travel of the host vehicle, and include such position predictions in collision avoidance algorithms while determining a safe travel path.

Figure 1B:
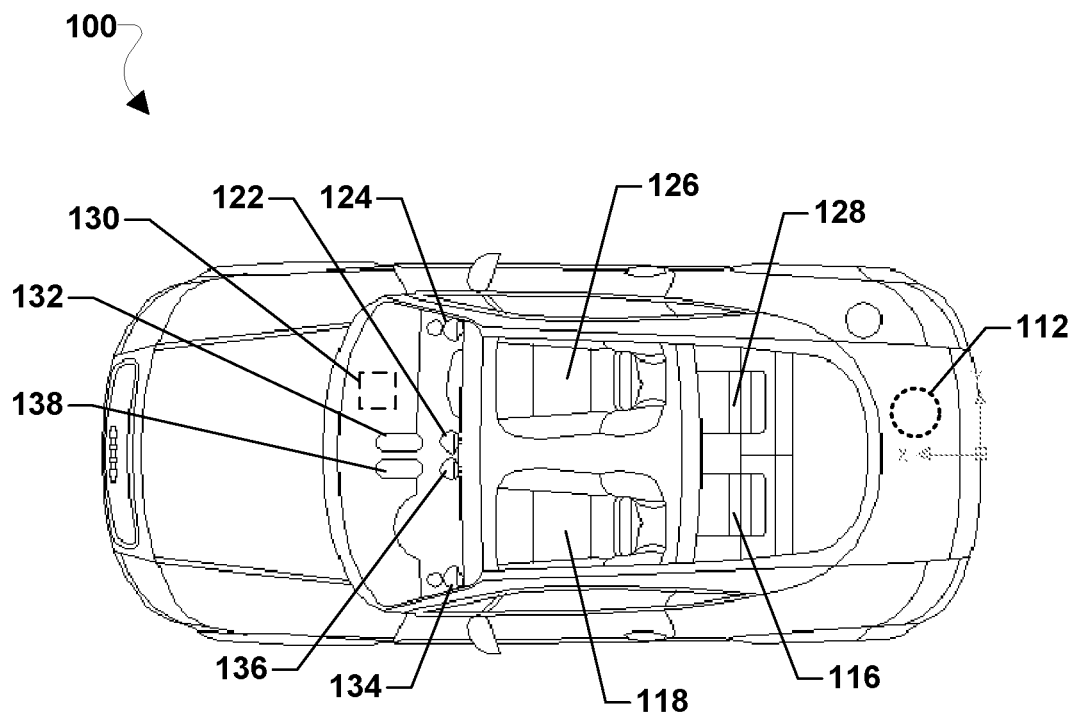

Various embodiments may be implemented within a variety of the host vehicles, an example vehicle 100 of which is illustrated in FIGS. 1A and 1B. With reference to FIGS. 1A and 1B, a host vehicle 100 may include a plurality of sensors 102-138 disposed in or on the host vehicle that are used for various purposes involved in autonomous and semiautonomous navigation as well as sensor data regarding objects and people in or on the host vehicle 100. The sensors 102-138 may include one or more of a wide variety of sensors capable of detecting a variety of information useful for navigation and collision avoidance. Each of the sensors 102-138 may be in wired or wireless communication with a control unit 140, as well as with each other. In particular, the sensors may include one or more cameras 122, 136 or other optical sensors or photo optic sensors. The sensors may further include other types of object detection and ranging sensors, such as radar 132, lidar 138, IR sensors, and ultrasonic sensors. The sensors may further include tire pressure sensors 114, 120, humidity sensors, temperature sensors, satellite geopositioning sensors 108, accelerometers, vibration sensors, gyroscopes, gravimeters, impact sensors 130, force meters, stress meters, strain sensors, fluid sensors, chemical sensors, gas content analyzers, pH sensors, radiation sensors, Geiger counters, neutron detectors, biological material sensors, microphones 124, 134, occupancy sensors 112, 116, 118, 126, 128, proximity sensors, and other sensors.

The host vehicle control unit 140 may be configured with processor-executable instructions to perform various embodiments using information received from various sensors, particularly the cameras 122, 136. In some embodiments, the control unit 140 may supplement the processing of camera images using distance and relative position (e.g., relative bearing angle) that may be obtained from radar 132 and/or lidar 138 sensors. The control unit 140 may further be configured to control steering, breaking and speed of the host vehicle 100 when operating in an autonomous or semiautonomous mode using information regarding other vehicles determined using various embodiments.

Figure 1C:
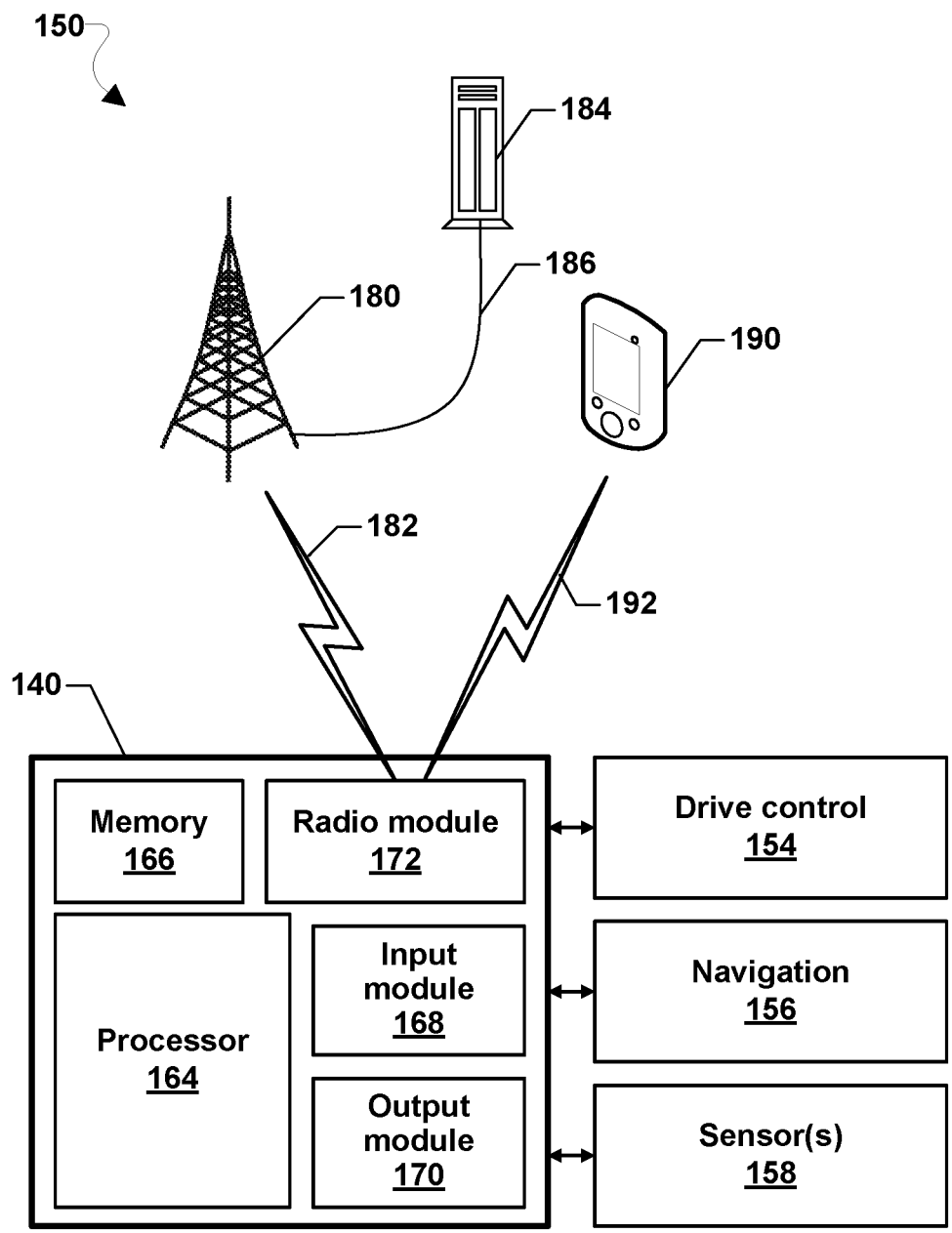
FIG. 1C is a component block diagram illustrating components of a vehicle suitable for implementing various embodiments.

FIG. 1C is a component block diagram illustrating a system 150 of components and support systems suitable for implementing various embodiments. With reference to FIGS. 1A, 1B, and 1C, a host vehicle 100 may include a control unit 140, which may include various circuits and devices used to control the operation of the host vehicle 100. The control unit 140 may be coupled to and configured to control drive control components 154, navigation components 156, and one or more sensors 158 of the host vehicle 100.

As used herein, the terms "component," "system," "unit," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The control unit 140 may include a processor 164 configured with processor-executable instructions to control maneuvering, navigation, and other operations of the host vehicle 100, including operations of various embodiments. The processor 164 may be coupled to a memory 166. The control unit 162 may include an input module 168, an output module 170, and a radio module 172.

The radio module 172 may be configured for wireless communication. The radio module 172 may exchange signals 182 (e.g., command signals for controlling maneuvering, signals from navigation facilities, etc.) with a network transceiver 180, and may provide the signals 182 to the processor 164 and/or the navigation unit 156. In some embodiments, the radio module 172 may enable the host vehicle 100 to communicate with a wireless communication device 190 through a wireless communication link 192. The wireless communication link 192 may be a bidirectional or unidirectional communication link, and may use one or more communication protocols.

The input module 168 may receive sensor data from one or more vehicle sensors 158 as well as electronic signals from other components, including the drive control components 154 and the navigation components 156. The output module 170 may be used to communicate with or activate various components of the host vehicle 100, including the drive control components 154, the navigation components 156, and the sensor(s) 158.

The control unit 140 may be coupled to the drive control components 154 to control physical elements of the host vehicle 100 related to maneuvering and navigation of the host vehicle, such as the engine, motors, throttles, steering elements, flight control elements, braking or deceleration elements, and the like. The drive control components 154 may also include components that control other devices of the host vehicle, including environmental controls (e.g., air conditioning and heating), external and/or interior lighting, interior and/or exterior informational displays (which may include a display screen or other devices to display information), and other similar devices.

The control unit 140 may be coupled to the navigation components 156, and may receive data from the navigation components 156 and be configured to use such data to determine the present position and orientation of the host vehicle 100, as well as an appropriate course toward a destination. In various embodiments, the navigation components 156 may include or be coupled to a global navigation satellite system (GNSS) receiver system (e.g., one or more Global Positioning System (GPS) receivers) enabling the host vehicle 100 to determine its current position using GNSS signals. Alternatively or in addition, the navigation components 156 may include radio navigation receivers for receiving navigation beacons or other signals from radio nodes, such as Wi-Fi access points, cellular network sites, radio station, remote computing devices, other vehicles, etc. Through control of the drive control elements 154, the processor 164 may control the host vehicle 100 to navigate and maneuver. The processor 164 and/or the navigation components 156 may be configured to communicate with a server 184 on a network 186 (e.g., the Internet) using a wireless connection 182 with a cellular data network 180 to receive commands to control maneuvering, receive data useful in navigation, provide real-time position reports, and assess other data.

The control unit 162 may be coupled to one or more sensors 158. The sensor(s) 158 may include the sensors 102-138 as described, and may the configured to provide a variety of data to the processor 164.

While the control unit 140 are described as separate components, in some embodiments some or all of the components (e.g., the processor 164, the memory 166, the input module 168, the output module 170, and the radio module 172) may be integrated in a single device or module, such as a system-on-chip (SOC) processing device. Such an SOC processing device may be configured for use in vehicles and be configured, such as with processor-executable instructions executing in the processor 164, to perform operations of various embodiments when installed into a host vehicle.

Figure 2A:
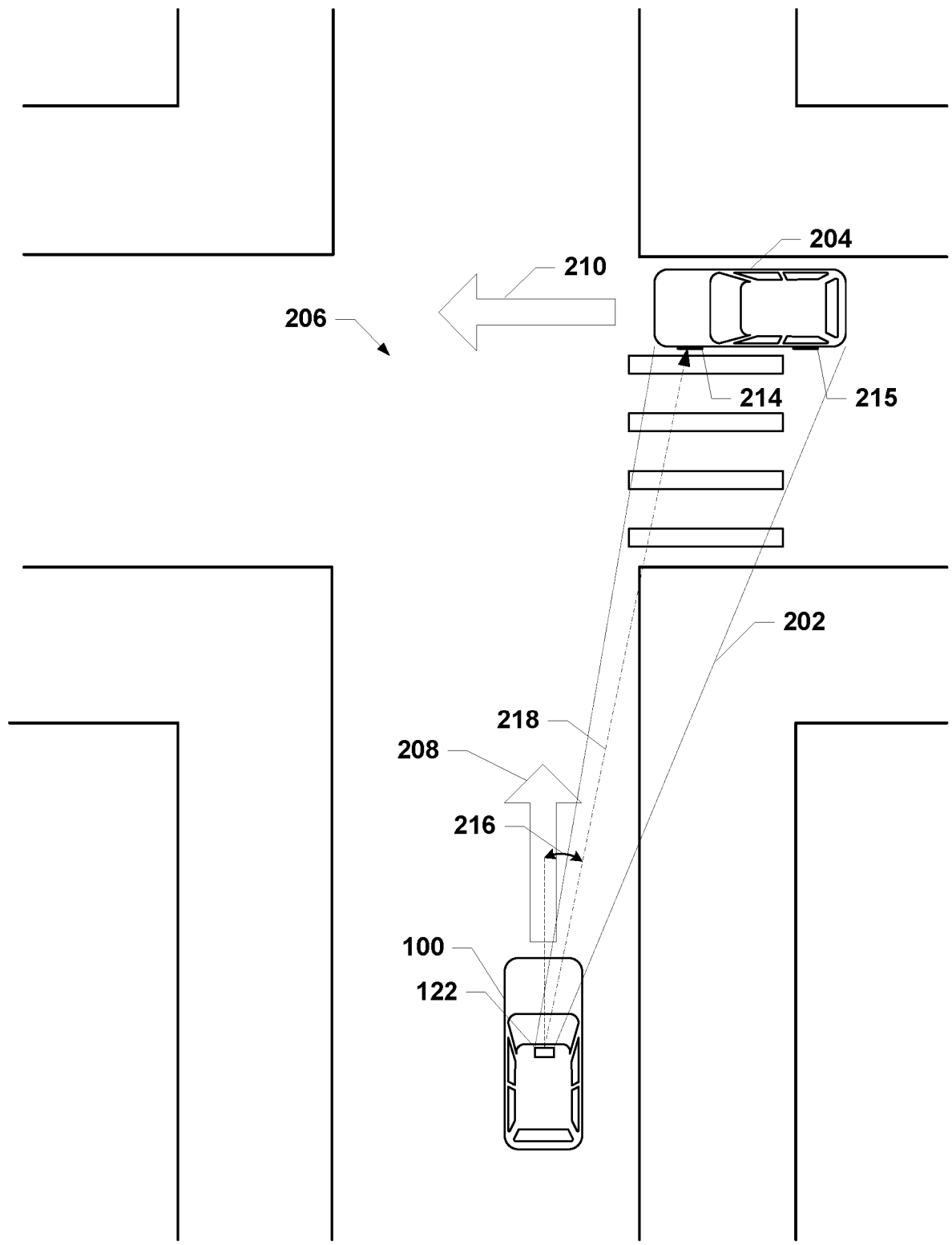
FIG. 2A is a diagram illustrating a vehicle observing another vehicle and predicting actions of the other vehicle according to various embodiments.
Figure 2B:
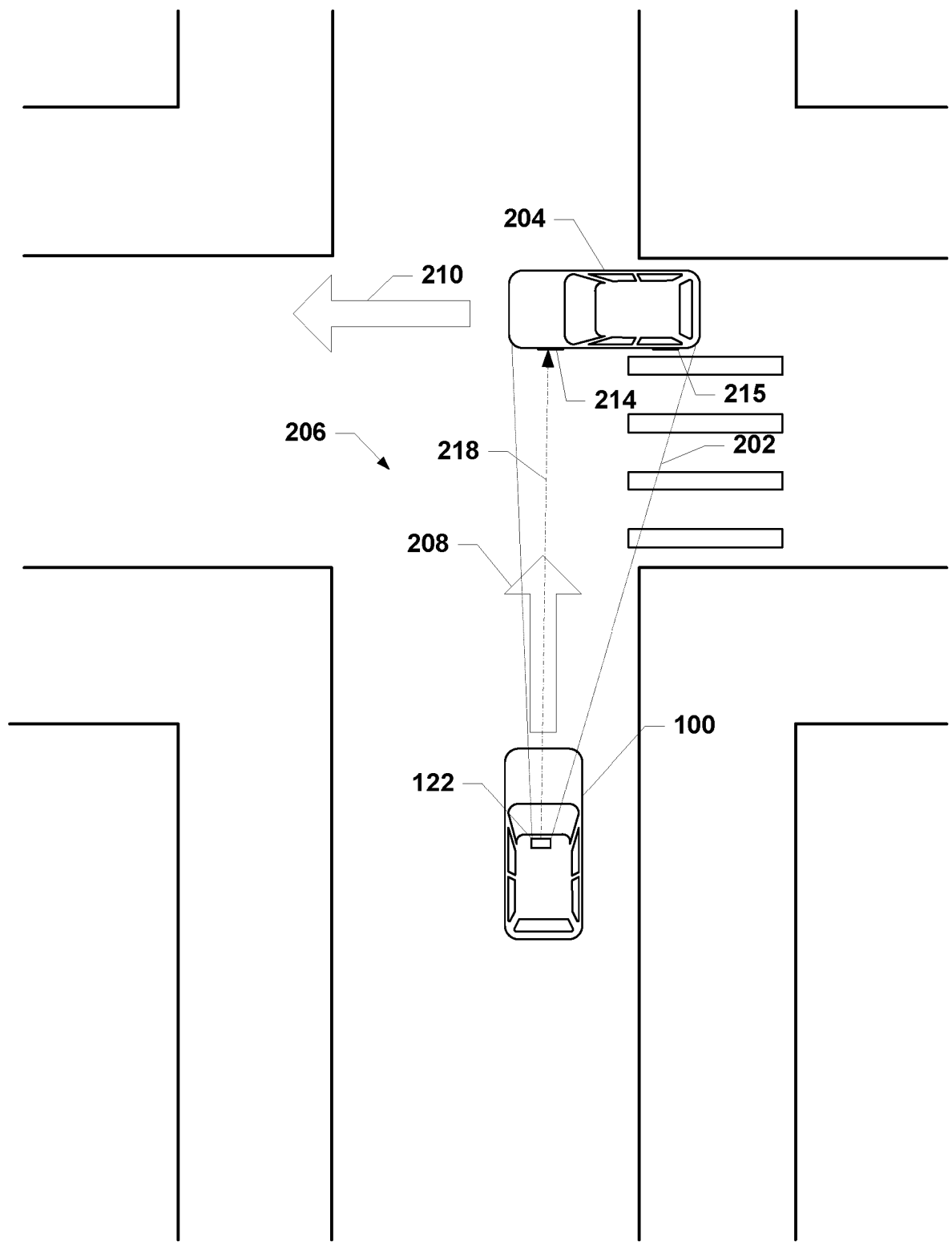
FIG. 2B is a diagram illustrating a vehicle taking actions based on predicted actions of another vehicle according to various embodiments.
Figure 2C:
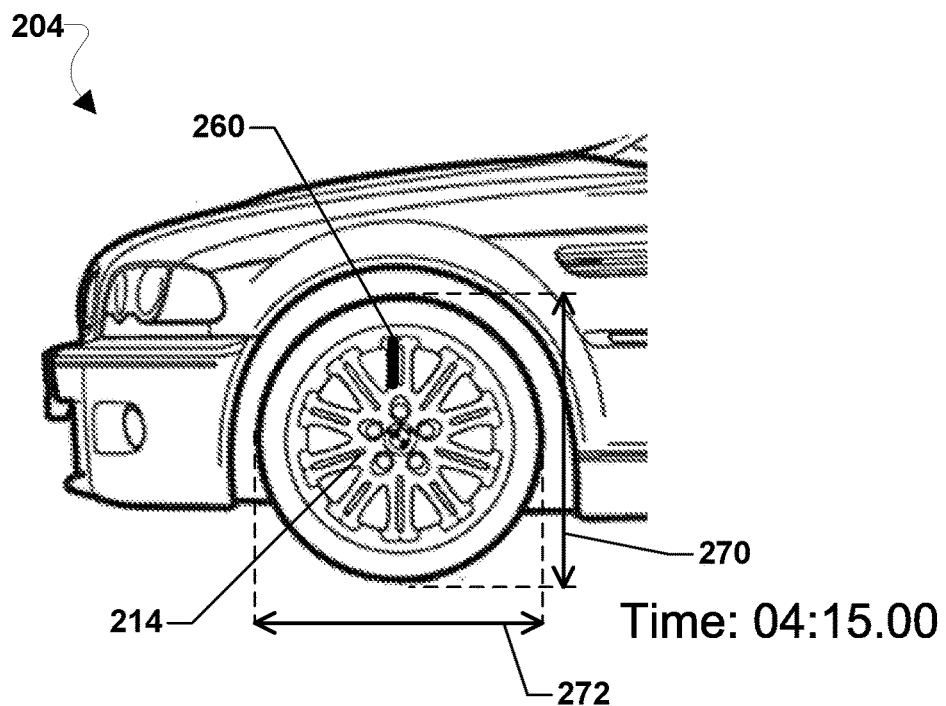
FIG. 2C is a diagram illustrating an identified wheel of another vehicle according to various embodiments.
Figure 2D:
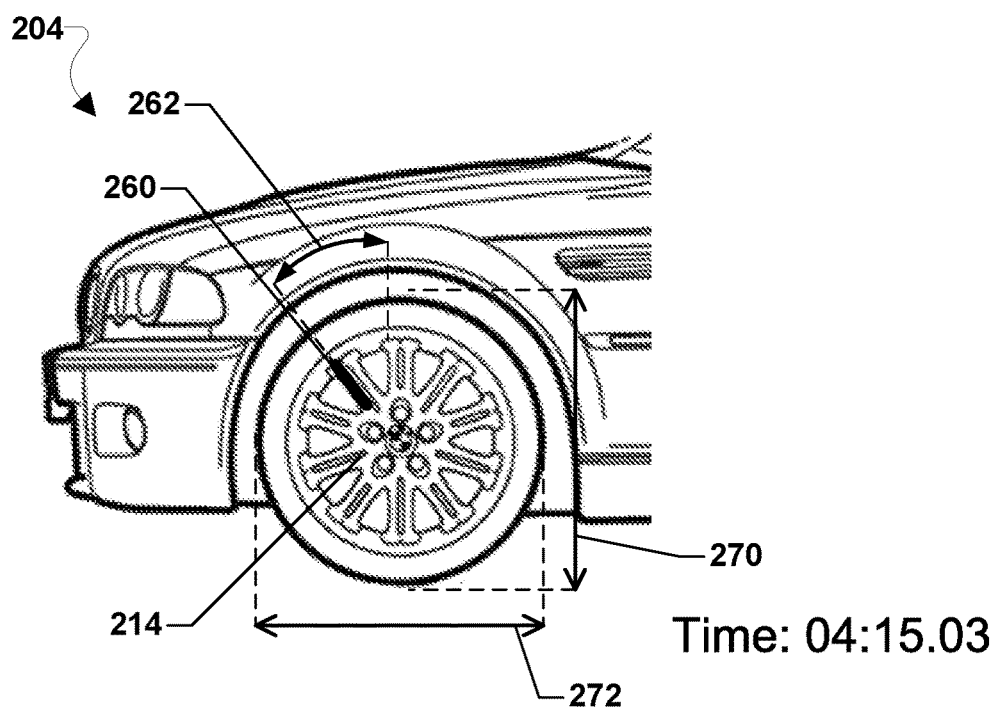
FIG. 2D is a diagram illustrating an identified wheel of another vehicle according to various embodiments.
Figure 2E:
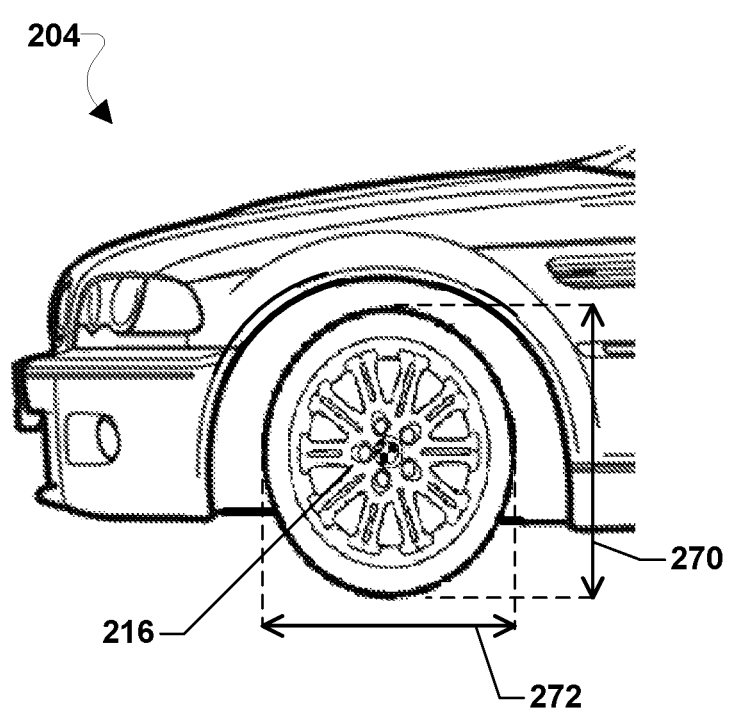
FIG. 2E is a diagram illustrating an identified wheel of another vehicle according to various embodiments.
Figure 2F:
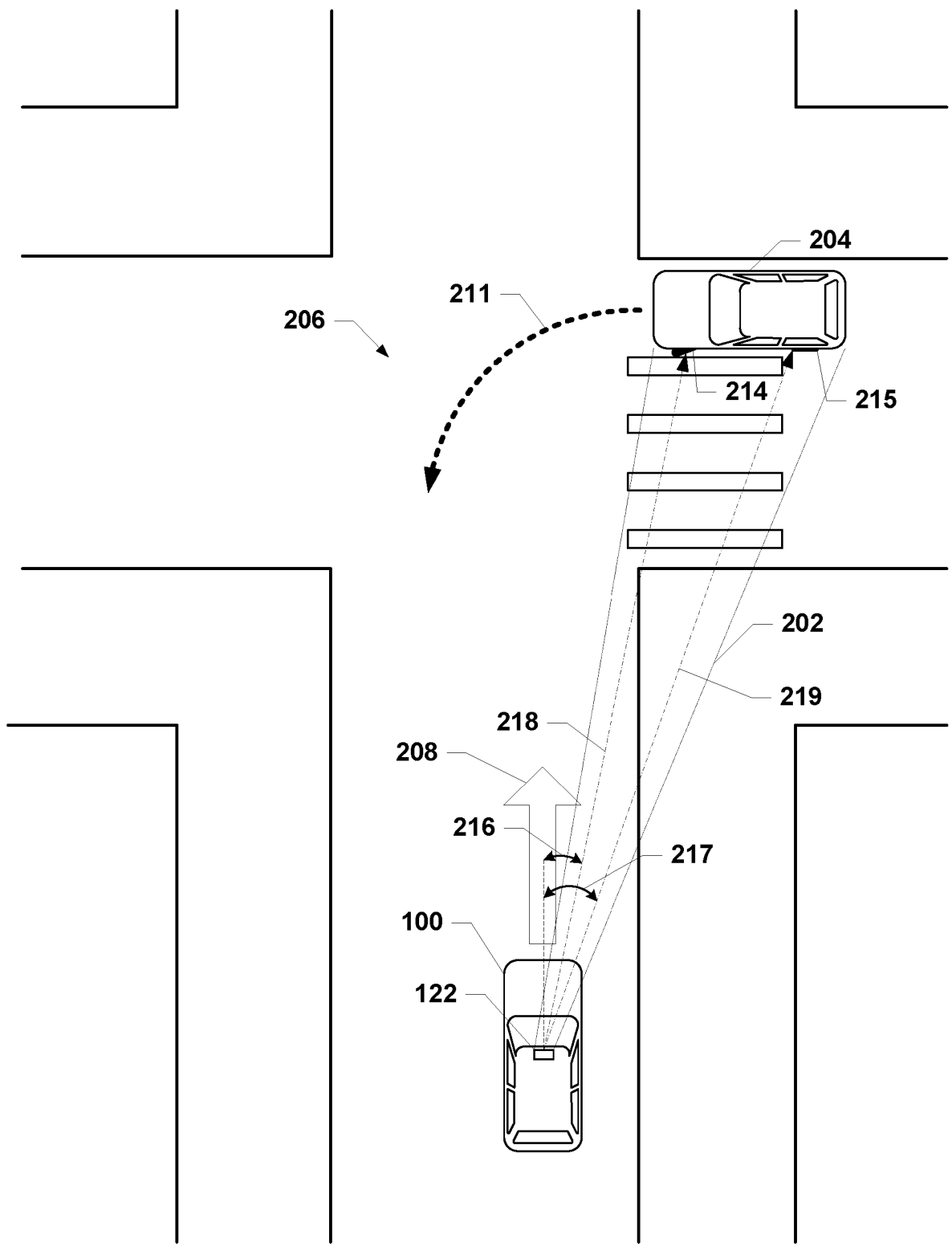
FIG. 2F is a diagram illustrating a vehicle observing another vehicle engaged in a turn according to various embodiments.

Feature tracking and analysis operations involved in various embodiments are illustrated in FIGS. 2A-2F and described with reference to FIGS. 1A-2F. FIGS. 2A, 2B and 2F are diagrams illustrating a host vehicle 100 estimating speed and direction of travel of another vehicle 204 according to various embodiments. FIGS. 2C-2E are illustrations of a portion of images of another vehicle illustrating measurements that may be made by a processor (e.g., 164) or control unit (e.g., 140).

FIG. 2A illustrates an example of a host vehicle 100 and another vehicle 204 approaching one another at an intersection 206. In the illustrated example, the host vehicle 100 and the second the other vehicle 204 are traveling along perpendicular paths towards the intersection 206, with the host vehicle 100 approaching the intersection 206 and the other vehicle 204 stopped at or beginning to enter the intersection 206.

A camera 122 on the host vehicle 100 may capture one or more images 202 of the other vehicle 204 and a control unit (e.g. 140), a processor (e.g., 164) within a control unit 140, or another processor device (generally referred to herein as a "processor") may perform image processing of the captured images. For example, the host vehicle 100 may utilize one or more cameras to capture a sequence of images 202 or video and process the images to determine whether another vehicle 204 is present in one or more images. If another vehicle 204 is identified in the one or more images, the processor within the host vehicle 100 may perform image processing on portions of the captured images containing the other vehicle 204 (as indicated by the dashed lines 202) to identify at least one wheel 214, 215 of the other vehicle 204. Although various examples describe identifying at least one wheel, this is only for simplicity and two or more wheels may be identified to improve reliability and provide redundancy. In vehicles with more than four wheels (e.g., trucks and trailers), images of more than two wheels may be processed in order to further reduce error in the estimates of rotation rate and relative angle. In the illustrated example, the processor of the host vehicle 100 has identified a front wheel 214 and a rear wheel 215 of the other vehicle 204. In various embodiments, the processor of the host vehicle 100 may utilize any suitable image processing method(s) to perform feature identification sufficient to identify wheels of other vehicles. In some embodiments, the processor may rectify one or more of the images and/or compensate for any rolling shutter effect due to relative motion of the vehicles and rotations of their wheels during the time that image frames are captured.

Referring to FIGS. 2C and 2D, the processor may perform further image processing of portions of captured images including an identified wheel 214, 215 to identify one or more features 260 that can be tracked from one image frame to the next for measuring wheel rotation. In some embodiments, the processor of the host vehicle 100 may determine a rate of rotation of an identified wheel(s) 214, 215 of the other vehicle 204 by measuring the change in position of one or more tracked features on the wheels from one image (or image frame) to the next, noting the time elapsed between images. For example, the processor of the host vehicle 100 may determine an angular positional change 262 of the one or more identified markings or other features 260 on a wheel 214, 215 between a first captured image (FIG. 2C) and a second captured image (FIG. 2D), and determine the amount of time elapsed between the first captured image and the second captured image. In the illustrated example, the first image frame (FIG. 2C) was captured at time 04:15:00 and the second image frame (FIG. 2D) was captured at time 04:15:03, so the time elapsed between the two images was 3 seconds. Based on the amount of angular positional change 262 of a tracked feature 260 on a wheel 214 and the amount of time elapsed between images of the wheel, the processor may determine the rate of rotation of the wheel of the other vehicle 204 by simple division.

Based on the determined rate of rotation of the wheel(s) 214, 215 of the other vehicle 204, the processor of the host vehicle 100 may estimate the speed of the other vehicle. As is well known, the circumference of a wheel is equal to $\pi$ (pi) times the wheel diameter 270, so the speed of the other vehicle may be estimated based on the determined rotation rate times the diameter times $\pi$. The wheel diameter 270 may be determined by the processor through image processing, such as by using trigonometry knowing the distance to the wheel from the camera 122 (i.e., a long line 218) and the relative size of the wheel 270 in the image, such as in terms of pixels spanning the diameter. The distance to the wheel 114 from the camera 122 may be estimated using a number of techniques, such as distance measurements by radar and/or lidar or stereos copy when the wheel is imaged by two cameras 122, 136 separated by a known distance. Alternatively, the processor may use a standard wheel diameter as such calculations, which may be stored in memory. In some embodiments, the processor may be configured to recognize a model of the other vehicle and look up a standard tire diameter associated with the other vehicle, and use that tire diameter in calculations of the other vehicle speed.

In some embodiments, the processor of the host vehicle 100 may also determine an orientation of the wheels 214, 215 of another vehicle 204 for use in determining that vehicle's direction of travel and/or turning radius. Such information may be very useful to collision avoidance and navigation processes implemented in vehicle safety systems or autonomous/semiautonomous vehicle control systems. In some embodiments, the processor may determine the orientation of other vehicle wheels 214, 215 by calculating a ratio of the observed horizontal diameter 272 on the wheel to the observed vertical diameter 270. Again, the processor may perform image processing and trigonometric calculations to determine the horizontal diameter 272 and vertical diameter 270 of a front wheel 214 of the other vehicle 204 by measuring the span of these dimensions within the image frame, such as in terms of pixels, and knowing the distance to the wheel. However, for purposes of determining the relative orientation of wheels 214, 215 diameter measurements may be relative measurements (e.g., pixels) because the measurements may be used by the processor to calculate a ratio of the horizontal diameter to the vertical diameter.

The processor may be configured to use the ratio of the horizontal diameter to the vertical diameter to determine the orientation of the wheel with respect to the host vehicle's camera, as the ratio is related to the sine of the relative orientation. For example, as illustrated in FIGS. 2C and 2D, when a wheel 214 is directly in front of and oriented perpendicular to a camera (e.g., 122) the wheel vertical diameter 270 will be equal to the horizontal diameter 272, and thus the ratio of the diameters will be equal to 1. As illustrated in FIG. 2E, when a wheel 214 is oriented at an angle to the camera, the wheel vertical diameter 270 will be greater than the horizontal diameter 272, and thus the ratio of the horizontal to vertical diameters will be less than 1. The more the relative orientation of the wheel 214 differs from perpendicular (i.e., 90°), the smaller the ratio of the horizontal diameter to the vertical diameter.

Referring to FIG. 2A, the relative orientation of a wheel 214 with respect to the camera 122 of the host vehicle 100 is a combination of the viewing angle 216 to the wheel 214 (i.e., the angle between the forward direction of the camera 122 and the line of sight 218 to the wheel) and the direction of travel of the wheel with respect to the camera 122. In some embodiments, the viewing angle 216 may be determined by the processor through processing of captured images to determine the distance (e.g., in pixels) in the image of the wheel from the image centerline. If the wheel 214 on the other vehicle 204 is oriented perpendicular to the camera on the host vehicle 100, as illustrated in FIG. 2A, then the relative orientation of the wheel 214 will be equal to the viewing angle 216. Thus, if the processor determines that the ratio of the horizontal diameter to the vertical diameter of a wheel 214 is consistent with the relative viewing angle to the other vehicle 204, the processor can determine that the other vehicle is moving in a direction perpendicular to that of the host vehicle 100. However, if the other vehicle 204 is traveling in a direction other than perpendicular to the host vehicle 100, the relative orientation of the wheel 214 will be equal to the viewing angle 216 plus an angle equal to 90 degrees minus the angle between the directions of travel 208, 210 of the two vehicles (which is 90 degrees in the example illustrated in FIGS. 2A and 2B). Thus, the processor is able to determine a direction of travel of the other vehicle 204 by determining the ratio of the horizontal diameter to the vertical diameter of the wheel(s) 214, 250 of the other vehicle and the viewing angle 216 to the wheels.

In the example illustrated in FIGS. 2A and 2B, the front wheel is not turned, so the direction of travel of the wheel is aligned with the direction of travel 210 of the other vehicle 204. Thus, the processor is able to estimate the future position of the other vehicle 204 based upon its direction of travel and determined speed, and take appropriate actions to avoid a collision. For example, as illustrated in FIG. 2B, the processor of the host vehicle 100 may have determined based on the determined rotation rate and size of other vehicle 204 wheels 214, 215, and the relative orientation of the wheels 214, 215, that the other vehicle was entering the intersection at a rate that would have resulted in a collision, and therefore may have applied the brakes to slow down (indicated by the shorter arrow 208) so that the other vehicle 204 could pass through the intersection 206 before the host vehicle 100.

Referring to FIG. 2F, in some embodiments, the processor of the host vehicle 100 may use determined ratios of horizontal to vertical diameters of front wheels 214 and rear wheels 215 to determine whether the other vehicle 204 is engaged in a turn and estimate an angle or path of such a turn. To do this, the processor of the host vehicle 100 may determine a relative orientation of the front wheel 214 and a relative orientation of the rear wheel 215 of the other vehicle 204 and determine whether the direction of travel of the vehicles differ. If the processor determines that the front and rear wheels are oriented at a different angles, the processor may estimate a turning angle or radius of turn based on the angular difference between the wheels and the distance between the wheels. In some embodiments, the processor may utilize image processing to map the front wheel 214 onto the rear wheel 215 to determine an angular difference between the wheels.

Similar to determining the direction of travel of a single wheel, the processor may calculate the ratio of the horizontal diameter 272 to the vertical diameter 270 of each of the front wheel 214 and rear wheel 215. The processor may further determine the viewing angle 216 to the front wheel 214, and the viewing angle 217 to the rear wheel 215 (i.e., the angle between the pointing direction 208 of the camera 122 and the line of sight 219 to the rear wheel 215) by processing captured images. The processor may then use these angles in combination with the respective diameter ratios to determine the orientation of the front and rear wheels with respect to the camera 122. The processor may also determine from captured images the distance between the front wheel 214 and rear wheel 215 (i.e. the wheelbase). Using the angular difference between the orientations of the front and rear wheels and the measured wheelbase, the processor can then predict a curved path of travel 211 that the other vehicle 204 is likely to follow.

Based on the estimated direction of travel, the estimated speed of travel, and the estimated angle of turn or predicted curved path of travel, the processor of the host vehicle 100 may predict future positions of the other vehicle 204, and such determinations may be shared with a collision avoidance module (which may be coupled to or executing within the processor) of the host vehicle 100. For example, the processor of the host vehicle 100 may predict that the other vehicle 204 will be proceeding through the intersection 206 in a manner that may pose a collision risk for the host vehicle 100 as depicted in FIG. 2B. As another example, the processor of the host vehicle 100 may predict that the other vehicle 204 will complete a turn through the intersection 206 in a manner that may or may not pose a collision risk for the host vehicle 100 as illustrated in FIG. 2F.

In some embodiments, the processor of the host vehicle 100 may utilize the estimated direction of travel, the estimated speed of travel, the estimated angle of turn, and/or the predicted future position of the other vehicle 204 to augment vehicle navigation and/or collision avoidance processes or systems. For example, in the scenario depicted in FIG. 2B, a collision avoidance module (which may be coupled to or executing within the processor) of the host vehicle 100 engaged brakes to slow the host vehicle 100 in order to avoid a collision with the other vehicle 204. As another example, in the scenario depicted in FIG. 2F, the collision avoidance module executing in the processor of the host vehicle 100 may both engage brakes and adjust the steering of the host vehicle 100 in order to avoid a collision with the other vehicle 204 as it turns onto the same street as the host vehicle.

Figure 3:
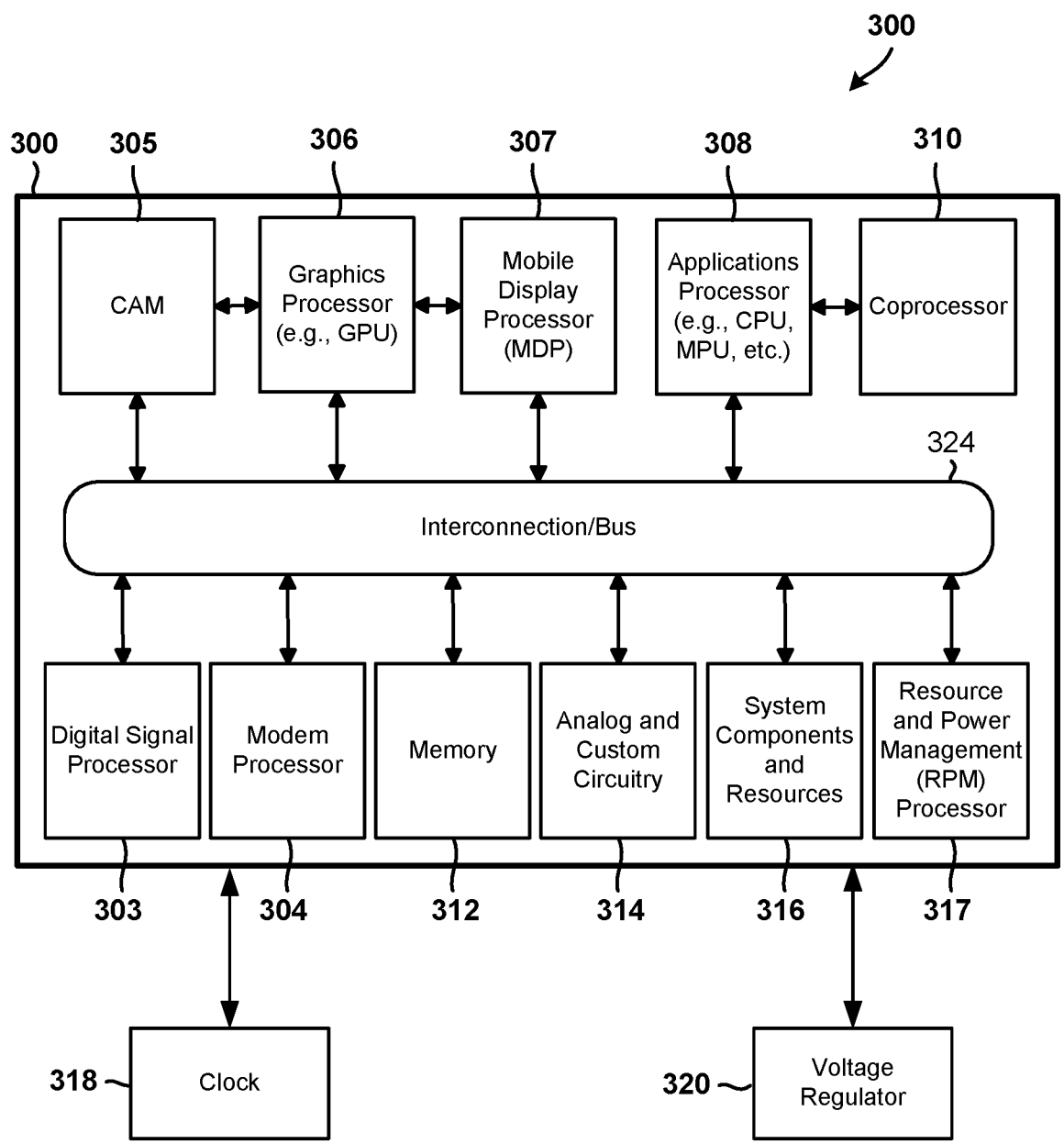
FIG. 3 is a block diagram illustrating components of an example system on chip for use in a vehicle that may be configured to collect and analyze sensor information in accordance with various embodiments.

FIG. 3 illustrates an example system-on-chip (SOC) architecture of a processing device SOC 300 suitable for implementing various embodiments in vehicles. The processing device SOC 300 may include a number of heterogeneous processors, such as a digital signal processor (DSP) 303, a modem processor 304, an image processor 306, a mobile display processor (MDP) 307, an applications processor 308, and a resource and power management (RPM) processor 317. The processing device SOC 300 may also include one or more coprocessors 310 (e.g., vector co-processor) connected to one or more of the heterogeneous processors 303, 304, 306, 307, 308, 317. Each of the processors may include one or more cores, and an independent/internal clock. Each processor/core may perform operations independent of the other processors/cores. For example, the processing device SOC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SOC's 300 main processor, central processing unit (CPU), microprocessor unit (MPU), arithmetic logic unit (ALU), etc. The graphics processor 306 may be graphics processing unit (GPU).

The processing device SOC 300 may include analog circuitry and custom circuitry 314 for managing sensor data, analog-to-digital conversions, wireless data transmissions, and for performing other specialized operations, such as processing encoded audio and video signals for rendering in a web browser. The processing device SOC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 300 also include specialized circuitry (CAM) 305 that includes, provides, controls and/or manages the operations of one or more cameras 122, 136 (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

In some embodiments, the image processor 306 may be configured with processor-executable instructions and/or specialized hardware configured to perform image processing analyses involved in various embodiments. For example, the image processor 306 may be configured to perform the operations of processing images received from cameras (e.g., 122, 136) via the CAM 305 to recognize and/or identify other vehicles, and further process portions of images including other vehicles to identify and track wheels on such vehicles. In some embodiments, the image processor 306 may be further configured to perform some or all of the operations of determining rotation rates of identified wheels, determining relative orientations of identified wheels, determining a turning radius of identified vehicles based on differences in relative orientations of wheels on another vehicle, and the like.

The system components and resources 316, analog and custom circuitry 314, and/or CAM 305 may include circuitry to interface with peripheral devices, such as cameras 122, 136 electronic displays, wireless communication devices, external memory chips, etc. The processors 303, 304, 306, 307, 308 may be interconnected to one or more memory elements 312, system components and resources 316, analog and custom circuitry 314, CAM 305, and RPM processor 317 via an interconnection/bus module 324, which may include an array of reconfigurable logic gates and/or implement a bus architecture (e.g., CoreConnect, AMBA, etc.). Communications may be provided by advanced interconnects, such as high-performance networks-on chip (NoCs).

The processing device SOC 300 may further include an input/output module (not illustrated) for communicating with resources external to the SOC, such as a clock 318 and a voltage regulator 320. Resources external to the SOC (e.g., clock 318, voltage regulator 320) may be shared by two or more of the internal SOC processors/cores (e.g., a DSP 303, a modem processor 304, a graphics processor 306, an applications processor 308, etc.).

In some embodiments, the processing device SOC 300 may be included in a control unit (e.g., 140) for use in a vehicle (e.g., 100). The control unit may include communication links for communication with a telephone network (e.g., 180), the Internet, and/or a network server (e.g., 184) as described.

The processing device SOC 300 may also include additional hardware and/or software components that are suitable for collecting sensor data from sensors, including motion sensors (e.g., accelerometers and gyroscopes), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well-known components of modern electronic devices.

Figure 4:
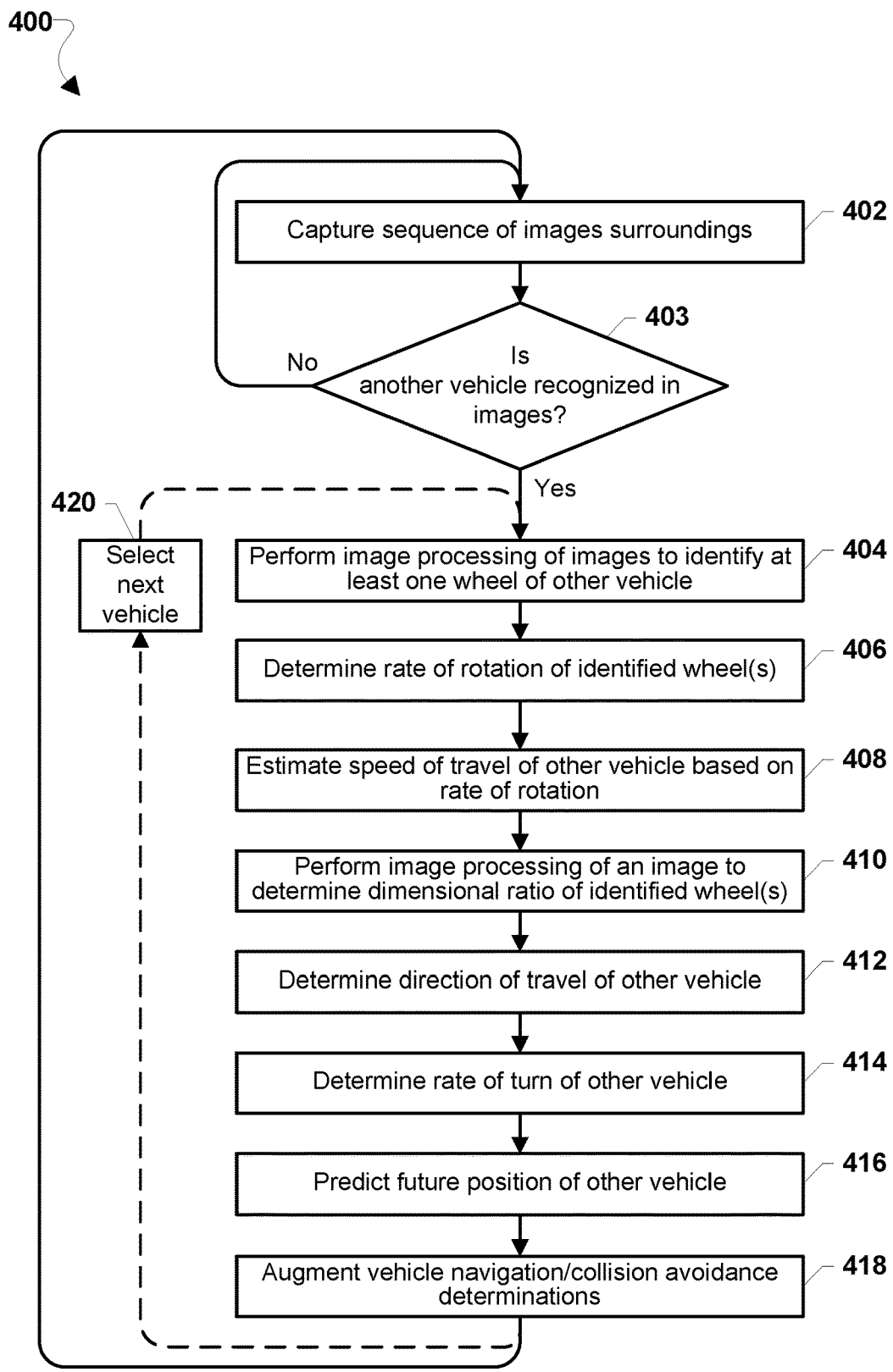
FIG. 4 is a process flow diagram illustrating an embodiment method of predicting a future position of another vehicle according to various embodiments.

FIG. 4 illustrates a method 400 of predicting a future position of another vehicle by a processor (e.g., a processor of a vehicle navigation system) according to various embodiments. With reference to FIGS. 1A-4, the method 400 may be implemented in a processor (e.g., 164), processing device (e.g., 300), and/or a control unit (e.g., 104) (variously referred to as a "processor") of a vehicle (e.g., 100). The order of operations performed in blocks 402-420 is merely illustrative, and the operations of blocks 402-420 may be performed in any order and partially simultaneously in various embodiments.

In block 402, the processor may control one or more cameras (e.g., 122, 136) and/or other image capture sensors to capture a sequence of images of the area surrounding a vehicle. In some embodiments, image sequences may be captured as part of a vehicle navigation collision avoidance system, and merely provided to the processor in block 402. Such images may be captured continuously throughout the method 400, and not performed as a separate operation.

In determination block 403, the processor may perform image analysis on captured image frames to recognize vehicles and determine whether there is another vehicle in a position to pose a risk to the host vehicle 100. In various embodiments, image analysis may include rectifying each image and/or compensating for any rolling shutter effect due to relative motion of the vehicles during the time required to capture each image frame. If the processor determines that no other vehicles are present in captured images (i.e., determination block 403="No"), the processor may continue to receive captured sequences of images of the surroundings in block 402 and analyzing the images to recognize other vehicles in determination block 403.

In response to determining that another vehicle or vehicles are present in captured images (i.e., determination block four three="Yes"), the processor may analyze the sequence of images to recognize at least one wheel (e.g., identified wheel 214) in another vehicle in block 404. For example, the processor may perform image processing on a portion of the sequence containing another vehicle to identify round or ellipsoidal shapes consistent with wheels. In some embodiments, the processor may further identify one wheel as a front wheel and one wheel as a rear wheel of the other vehicle. In some embodiments, the processor may identify three or more wheels (e.g., a tractor-trailer, a truck, or other vehicle pulling a trailer).

In block 406, the processor may further analyze image data including one or more wheels to identify a feature or features that can be tracked from one image frame to the next, and measure the shift in position of such feature(s) between at least two image frames to determine a rate of rotation of the one or more wheels. As described, the processor may determine the rate of rotation of a wheel based on an angular displacement an identified feature (e.g., 264) between a first image frame and a second image within the sequence of images and an amount of time elapsed between the first and second image frames.

In block 408, the processor may estimate a speed of travel of the other vehicle based on the determined rate of rotation of the identified one or more wheels and a measurement or estimated diameter of the wheel as described. For example, if the determined rate of rotation of the at least one identified wheel is zero, the processor may estimate that the other vehicle is standing still (i.e., speed of travel is zero).

In block 410, the processor may determine a relative orientation of one or more wheels on the other vehicle by determining a ratio of the horizontal diameter (e.g., 272) to the vertical diameter (e.g., 270) of at least one identified wheel and as described. For example, the processor may determine a horizontal diameter and a vertical diameter of the wheel based on image analysis and the distance to the other vehicle. As another example, the processor may determine the horizontal diameter to vertical diameter ratio based on a number of pixels spanning the two dimensions. In some embodiments, the processor may determine a relative orientation of a wheel by determining a ratio of major axes of an ellipse corresponding to the wheel. In block 410, the processor may also determine the viewing angle of the camera to the wheel.

In block 412, the processor may determine a viewing angle from the host vehicle to the wheel (if not determined in a prior block), estimate a direction of travel of the other vehicle based on the relative orientation of one or more wheels of the other vehicle and the viewing angle as described. For example, if the ratio of the horizontal diameter to the vertical diameter indicates a relative orientation of the wheel(s) that is equal to the viewing angle to the wheel(s), the processor may determine that the direction of travel of the other vehicle as approximately perpendicular to the host vehicle.

In block 414, the processor may estimate an angle of turn of the other vehicle based upon a difference in the orientation of the front wheel and the rear wheel of the other vehicle. In some embodiments, the processor may estimate the angle of turn of the other vehicle based on the difference between the orientation of the front wheel and rear wheel and the wheelbase (i.e. distance between the front wheel and rear wheels) of the other vehicle. In some embodiments, the processor may use image processing to map the front wheel onto the rear wheel to determine an angular difference in orientation between the two wheels.

In block 416, the processor may predict a future position of the other vehicle based on the determined direction of travel, the determined speed of travel, and/or the determined angle of turn (if any) of the other vehicle. For example, if the estimated direction of travel is perpendicular to the host vehicle, the estimated speed of travel is zero, and the estimated angle of turn is zero, the processor may predict that the other vehicle will remain in its current position. In another example, if the estimated direction of travel is perpendicular to the host vehicle, the estimated speed of travel is greater than zero, and the estimated angle of turn is zero, the processor may predict that the other vehicle will cross the path of travel of the host vehicle.

In block 418, information on the estimated direction of travel, the estimated speed of travel, the estimated angle of turn, and/or the predicted future position of the other vehicle may be used or provided by the processor to augment vehicle navigation and/or collision avoidance systems. For example, if the processor determines that the other vehicle is predicted to remain stopped, the processor may inform a vehicle navigation process that the other vehicle it is likely to remain stationary so that no change in the direction and speed of travel of the host vehicle is required. As another example, if the processor determines that the other vehicle is predicted to intersect with the host vehicle, this information may be used in collision avoidance calculations, which may result in the processor engaging brakes and/or taking other actions to avoid a collision with the other vehicle. In some embodiments, the processor performing various embodiments may be separate from a vehicle navigation system performing autonomous or semiautonomous navigation and control of the host vehicle, in which case the processor may provide analysis of other vehicles to the vehicle navigation system.

In many situations there will be multiple other vehicles within images captured by the camera(s). In such situations, the processor may select another vehicle in block 420 and repeat the operations of blocks 404 through 418 for the selected other vehicle as described.

In some embodiments, the operations of the method 400 may be performed continuously as part of an autonomous or semiautonomous navigation process. In such embodiments, images of surroundings in block 402 may be captured continuously as part of the navigation process and used by the processor or determining the movement of other vehicles in parallel with other navigation processes. Further, operations of determining the rotation rate of wheels and estimating vehicle speed in blocks 406 and 408 may be performed in parallel with determining the relative orientation of the wheels and estimated direction of travel of the other vehicle in blocks 410 and 412. In some embodiments, the processor may perform only some of the operations of the method 400, such as only determining the speed of other vehicles based upon determine rotation rates of vehicle wheels.

In some embodiments, the processor may perform some of the operations of the method 400 or other methods to determine whether a detected vehicle is moving slower than a threshold speed above which the method 400 should not be performed. For example, if the processor determines that the speed of the other vehicle exceeds a speed threshold, the processor may not perform other operations of the method 400 relative to the other vehicle. This is because, the angular rotation of the wheels from one frame to the next may only be measured using image processing methods if the wheels rotate less than one full revolution (i.e., <360 degrees) in the time between image frames. Thus, the processor may not use methods of various embodiments if a detected vehicle is moving faster than a threshold speed, and instead use conventional motion detection methods, such as determining the shift in position of the vehicle from one image frame to the next. In some embodiments, the threshold speed may be the same for all vehicles. In some embodiments, the threshold speed may be calculated based by estimating the diameter of the vehicle's wheels from image processing. For example, the processor may set the threshold speed to a value less than pi times the wheel diameter divided by the time between image frames in appropriate units.

Figure 5:
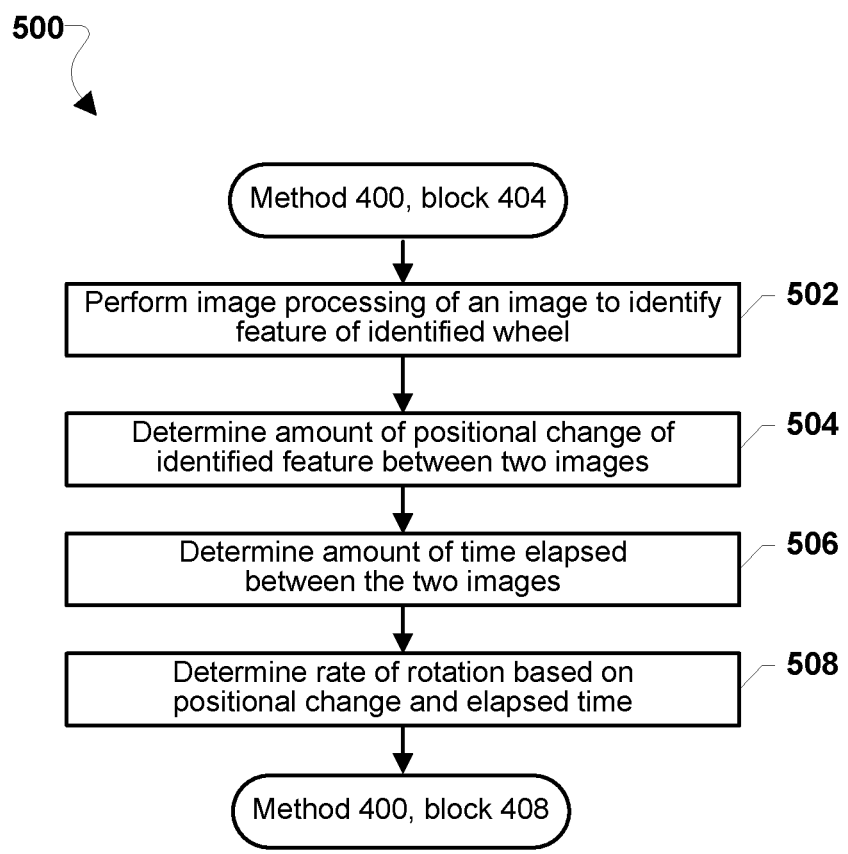
FIG. 5 is a process flow diagram illustrating an embodiment method of determining a rate of rotation of a wheel of another vehicle according to various embodiments.

FIG. 5 illustrates a method 500 of determining a rate of rotation of an identified wheel of another vehicle by a processor (e.g., a processor of a vehicle navigation system) according to various embodiments. With reference to FIGS. 1A-5, the method 500 may be implemented in a processor (e.g., 164), processing device (e.g., 300), and/or a control unit (e.g., 104) (variously referred to as a "processor") of a vehicle (e.g., 100). The method 500 provides an example of operations that may be performed in block 406 of the method 400. The order of operations performed in blocks 502-508 is merely illustrative, and the operations of blocks 502-508 may be performed in any order and partially simultaneously in various embodiments.

In block 502, the processor may perform image processing on captured images to identify a feature (e.g., 260) of an identified wheel of another vehicle that can be tracked from one image frame to the next. The identified feature may be any form of recognizable feature, such as a letter or number imprinted on a sidewall of the identified wheel, a pattern (e.g., a portion of tread), a discoloration or dirt on a portion of the wheel or rim, a characteristic element of the rim, or other marking or imperfection on the wheel.

In block 504, the processor may determine an amount of positional change (e.g., 264) of the identified feature of the wheel between at least two images. In some embodiments, the processor may track movements of the identified feature of the wheel between a first image frame and a second image frame within the sequence of images, and use the movements between the two image frames two calculate an angular rotation of the wheel that would produce such movements. Miscalculation may involve determining the distance of the tracked feature from the center of the wheel to calculate the angular rotation between the two images. If the identified feature is in the same location in both the first and second image frames, the amount of positional change is zero indicating that the wheel is not turning.

In block 506, the processor may determine an amount of time elapsed between the first image frame and the second image frame. This determination may be based upon a frame rate of the camera capturing the sequence of images, a timestamp on each of the image frames, or other methods of determining the time between image frames.

In block 508, the processor may determine a rate of rotation of the identified wheel based on the rotational movement of the tracked feature. In some embodiments, this operation may involve determining an amount of rotation of the wheel that occurred between the first and second image frames based on the amount of positional change determined in block 504, and dividing amount of rotation of the wheel by the amount of time elapsed between the first and second image frames. For example, the processor may divide the angular rotation observed between the first and second image frames by 360° and by the time elapsed between the image frames to result in an estimate of the rotations per unit time. As an example, if the angular rotation observed between the first and second image frames was 36° and the time between the image frames was a tenth of a second, the processor would estimate that the wheel is turning at a rate of 1 revolution per second or 60 revolutions per minute. Continuing this example, if the diameter of the of the wheel is 30 inches (0.76 m), the processor would estimate that the other vehicle is moving at a rate of about 471 feet per minute or about 5.4 miles per hour (8.7 km/hr). Extending this example of a 30-inch (0.76 m) diameter wheel and a camera capturing 10 image frames per second (FPS), such a camera should be able to uniquely capture up to 5 Hz signals (the Nyquist frequency), and thus determine frame-to-frame angles of rotation for tire rotation rates up to just less than five revolutions per second. Thus, in the situation of a 10 FPS camera imaging a 30-inch diameter wheel, it can be seen that a threshold speed beyond which the method 500 may not be employed by a processor is about 26.8 miles per hour (43 km/hr) or less.

Figure 6:
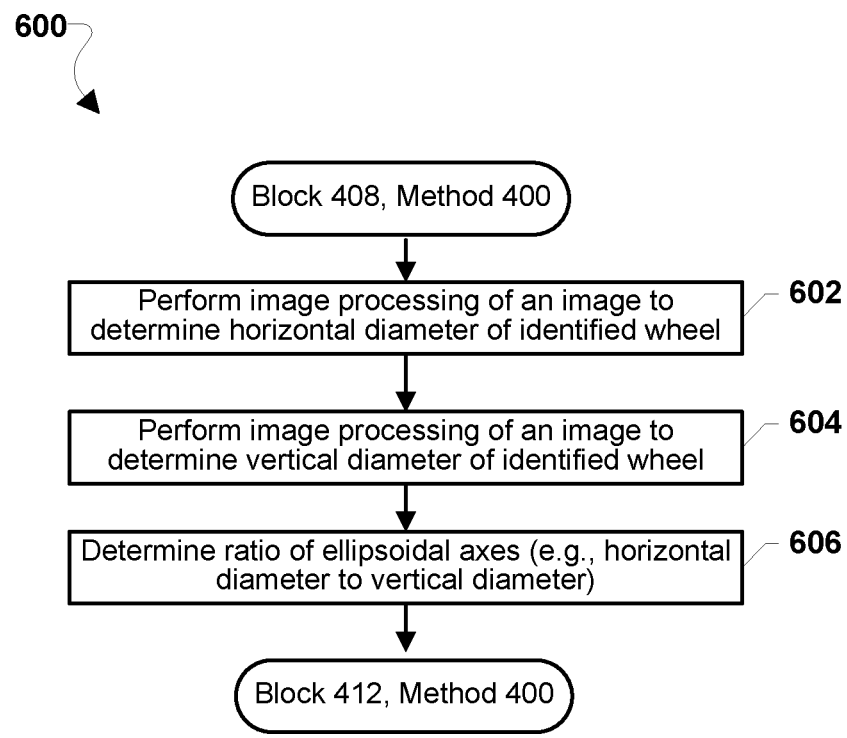
FIG. 6 is a process flow diagram illustrating an embodiment method of calculating a dimensional ratio of a wheel of another vehicle according to various embodiments.

FIG. 6 illustrates a method 600 of calculating a dimensional ratio of an identified wheel of another vehicle by a processor (e.g., a processor of a vehicle navigation system) according to various embodiments. With reference to FIGS. 1A-6, the method 600 may be implemented in a processor (e.g., 164), processing device (e.g., 300), and/or a control unit (e.g., 104) (variously referred to as a "processor") of a vehicle (e.g., 100). The method 600 provides an example of operations that may be performed in block 410 of the method 400. The order of operations performed in blocks 602-606 is merely illustrative, and the operations of blocks 602-606 may be performed in any order and partially simultaneously in various embodiments.

In block 602, the processor may calculate a horizontal diameter (e.g., 272) of an identified wheel of the other vehicle. For example, the processor may calculate a distance from an outer left side of the identified wheel to an outer right side of the identified wheel by determining the number of pixels spanning this dimension in an image frame. In some embodiments the processor may determine a distance in terms of a length of measure based on a distance to the wheel (as may be determined via radar, lidar and/or stereoscopy) and the number of pixels spanning the dimension.

In block 604, the processor may calculate a vertical diameter (e.g., 270) of an identified wheel of the other vehicle. For example, the processor may calculate a distance from an outer top side of the identified wheel to an outer bottom side of the identified wheel by determining the number of pixels spanning this dimension in an image frame. In some embodiments the processor may determine a distance in terms of a length of measure based on a distance to the wheel (as may be determined via radar, lidar and/or stereoscopy) and the number of pixels spanning the dimension.

In block 606, the processor may calculate the ratio of the horizontal diameter to the vertical diameter of the identified wheel. The processor may then use this ratio in performing operations of the method 400 as described.

Figure 7:
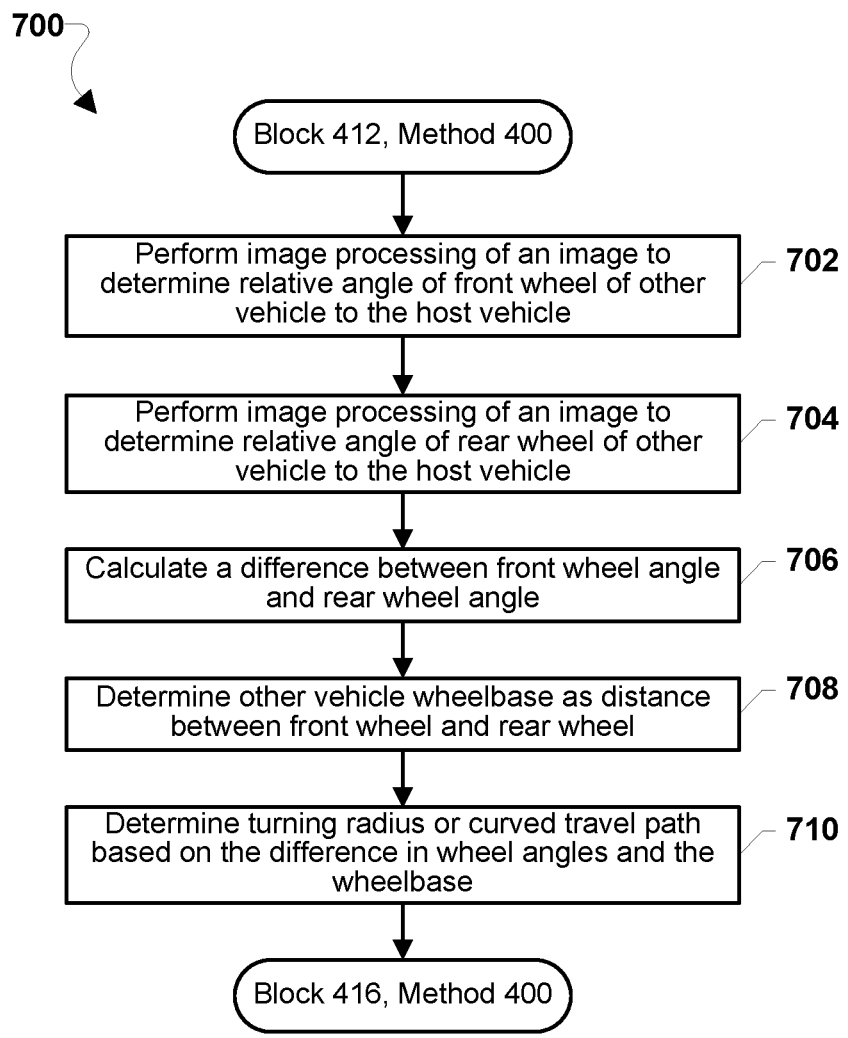
FIG. 7 is a process flow diagram illustrating an embodiment method of estimating an angle of turn of another vehicle according to various embodiments.

FIG. 7 illustrates a method 700 of determining by a processor (e.g., a processor of a vehicle navigation system) an angle of turn of another vehicle based on processing of images of the wheels according to various embodiments. With reference to FIGS. 1A-7, the method 700 may be implemented in a processor (e.g., 164), processing device (e.g., 300), and/or a control unit (e.g., 104) (variously referred to as a "processor") of a vehicle (e.g., 100). The method 700 provides an example of operations that may be performed in block 414 of the method 400. The order of operations performed in blocks 702-706 is merely illustrative, and the operations of blocks 702-706 may be performed in any order and partially simultaneously in various embodiments.

In block 702, the processor may determine the relative angle of the front wheel of the other vehicle with respect to the host vehicle based on a determined ratio of horizontal diameter to the vertical diameter observed in the image of the front wheel. The ratio of the horizontal diameter to the vertical diameter may be determined by the processor in block 410 of the method 400, as well as block 602 through 606 of the method 600 as described. In addition to the ratio of wheel horizontal diameter to vertical diameter, the processor may take into consideration the viewing angle (e.g., 216) of the front wheel from the host vehicle camera (e.g., 122) when calculating the relative angle of the front wheel as described.

In block 704, the processor may determine the relative angle of the rear wheel of the other vehicle with respect to the host vehicle based on a determined ratio of horizontal diameter to the vertical diameter observed in the image of the rear wheel. Again, the ratio of the horizontal diameter to the vertical diameter may be determined by the processor in block 410 of the method 400, as well as block 602 through 606 of the method 600 as described. In addition to the ratio of wheel horizontal diameter to vertical diameter, the processor may take into consideration the viewing angle (e.g., 217) of the rear wheel from the host vehicle camera (e.g., 122) when calculating the relative angle of the front wheel as described. However, in situations in which the other vehicle is located at a large distance from the host vehicle, the viewing angles of the front and rear wheels may be ignored because the difference in viewing angles between front and rear wheels may be small.

In block 706, the processor may determine the difference between the front wheel angle and the rear wheel angle, such as via simple subtraction. For example, if the difference between the relative angles of the front and rear wheels is approximately zero, this will indicate to the processor that the front wheel is not turned and the other vehicle is likely to follow a straight line. On the other hand, if the difference in relative angles of the front and rear wheels is other than zero, this will indicate to the processor that the front wheel is turned and the other vehicle is likely to follow a curved path. Depending upon how the difference is calculated, the sign of the difference will also indicate to the processor whether the other vehicle will turn to the left or turn to the right. For example, if the processor determines that the front wheel relative angle (e.g., 216) is less than the rear wheel relative angle (e.g., 217), this may indicate that the other vehicle will be turning towards the host vehicle (e.g., curved path 211). As another example, if the processor determines that the front wheel relative angle (e.g., 216) is greater than the rear wheel relative angle (e.g., 217), this may indicate that the other vehicle will be turning away from the host vehicle.

In block 708, the processor may determine the wheelbase of the other vehicle as the distance between the front wheel and the rear wheel. As described, this may be determined by the processor through processing of the portion of the images including the other vehicle to determine the distance within the image between the two wheels (e.g., a number of pixels), determining the distance to the other vehicle (e.g., via radar, lidar or stereoscopy), and using trigonometry to estimate the actual distance between the wheels.

In block 710, the processor may determine a turning radius or otherwise estimate the curved travel path of the other vehicle based on the difference in relative angles of the front and rear wheels and the determined wheelbase. The processor then may use the determine turning radius or curved travel path is part of predicting the future position of the other vehicle in block 416 of the method 400 as described.

Various embodiments and embodiments may improve the operation of vehicle navigation systems and/or vehicle safety systems, including collision avoidance and navigation systems of autonomous and semiautonomous vehicles, by improving state and intention prediction of other vehicles based on optical tracking of wheel rotation. Various embodiments may be used to augment vehicle navigation and/or collision avoidance systems for autonomous and semiautonomous vehicles. Additionally, various embodiments may be used as part of safety systems by providing more accurate collision warnings for drivers. Various embodiments may also be useful in other applications where monitoring of vehicle traffic is involved, such as traffic monitoring cameras positioned at or near intersections. Therefore, the claims should not be construed to be limited to vehicle systems unless specifically recited in a claim element.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of various embodiments.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the scope of the embodiments. Thus, various embodiments are not intended to be limited to the embodiments shown herein but are to be accorded the widest scope consistent with the following claims and the principles and novel features disclosed herein.

What is claimed is:

1. A method of using image data to estimate motion of an observed vehicle, comprising:
   capturing, by a camera, a sequence of images including the observed vehicle;
   performing, by a processor, image processing to identify a wheel of the observed vehicle within the sequence of images; and
   determining, by the processor, a rate of rotation of the wheel based on changes in orientation of the wheel between at least two images within the sequence of images, comprising:
      performing image processing to identify a feature of the wheel present in a first image of the wheel and a second image of the wheel;
      performing image processing to identify a center of the wheel in each of the first and second images of the wheel;
      determining an amount of positional change of the identified feature of the wheel between the first and second images of the wheel;
      determining an angle of rotation of the identified feature of the wheel between the first and second images of the wheel based on the amount of positional change of the identified feature of the wheel between the first and second images of the wheel and the center of the wheel in each of the first and second images of the wheel;
      determining an amount of time elapsed between the first image and the second image; and
      determining the rate of rotation of the wheel based on the determining the angle of rotation of the identified feature and the amount of time elapsed between the first and second images of the wheel.

2. The method of claim 1, further comprising:
   performing image processing of at least one image to determining a diameter of the wheel; and
   determining a speed of the observed vehicle based on the determined rate of rotation of the wheel and the diameter of the wheel.

3. The method of claim 2, further comprising:
   augmenting a vehicle navigation system of a host vehicle using the determined speed of the observed vehicle.

4. A method of using image data to estimate motion of an observed vehicle, comprising:
   capturing, by a camera, a sequence of images including the observed vehicle;
   performing, by a processor, image processing to identify a wheel of the observed vehicle within the sequence of images; and
   determining a direction of travel of the observed vehicle based on image processing of the wheel within the sequence of images, comprising:
      performing image processing of at least one image to determine an observed horizontal diameter of the wheel;
      performing image processing of at least one image to determine an observed vertical diameter of the wheel; and
      determining a relative angle of the wheel with respect to the camera based at least upon a ratio of the observed horizontal diameter to the observed vertical diameter.

5. The method of claim 4, further comprising:
   augmenting a vehicle navigation system of a host vehicle using the determined direction of travel of the observed vehicle.

6. The method of claim 1, further comprising determining whether the observed vehicle is turning based on image processing of a front wheel and a rear wheel of the observed vehicle within the sequence of images.

7. The method of claim 1, further comprising determining an angle of turn of the observed vehicle based on image processing of a front wheel and a rear wheel of the observed vehicle within the sequence of images.

8. The method of claim 7, wherein performing image processing to identify the wheel of the observed vehicle within the sequence of images comprises performing, by the processor, image processing of at least one image to identify the front wheel and the rear wheel of the observed vehicle, the method further comprising:

image processing of the sequence of images to determine a relative angle of the front wheel with respect to a camera capturing the sequence of images;

image processing of at least one image to determine a relative angle of the rear wheel with respect to the camera;

image processing of at least one image to determine a distance between the front wheel and the rear wheel; and determining a rate of turn of the observed vehicle based on the distance between the front wheel and the rear wheel, a linear speed of the observed vehicle based on the determined rate of rotation, and a difference between the relative angle of the front wheel and the relative angle of the rear wheel.

9. The method of claim 7, further comprising:

augmenting a vehicle navigation system of a host vehicle using the determining angle of turn of the observed vehicle.

10. A vehicle navigation system, comprising:

a camera configured to capture images external to a vehicle; and a processor configured to receive a sequence of images from the camera and configured with processor-executable instructions to:

perform image processing to identify a wheel of an observed vehicle within the sequence of images; and determine a rate of rotation of the wheel based on changes in orientation of the wheel between at least two images within the sequence of images, comprising:

identifying a feature of the wheel present in a first image of the wheel and a second image of the wheel;

performing image processing to identify a center of the wheel in each of the first and second images of the wheel;

determining an amount of positional change of the identified feature of the wheel between the first and second images of the wheel;

determining an angle of rotation of the identified feature of the wheel between the first and second images of the wheel based on the amount of positional change of the identified feature of the wheel between the first and second images of the wheel and the center of the wheel in each of the first and second images of the wheel;

determining an amount of time elapsed between the first image and the second image; and determining the rate of rotation of the wheel based on the determining angle of rotation of the identified feature and the amount of time elapsed between the first and second images of the wheel.

11. The vehicle navigation system of claim 10, wherein the processor is further configured with processor-executable instructions to:

perform image processing to determine a diameter of the wheel; and determine a speed of the observed vehicle based on the determined rate of rotation of the wheel and the diameter of the wheel.

12. A vehicle navigation system, comprising:

a camera configured to capture images external to a vehicle; and a processor configured to receive a sequence of images from the camera and configured with processor-executable instructions to:

perform image processing to identify a wheel of an observed vehicle within the sequence of images; and determine a direction of travel of the observed vehicle based on image processing of the wheel within the sequence of images, comprising:

performing image processing of at least one image to determine an observed horizontal diameter of the wheel;

performing image processing of at least one image to determine an observed vertical diameter of the wheel; and determining a relative angle of the wheel with respect to the camera based at least upon a ratio of the observed horizontal diameter to the observed vertical diameter.

13. The vehicle navigation system of claim 10, wherein the processor is further configured with processor-executable instructions to determine whether the observed vehicle is turning based on image processing of a front wheel and a rear wheel of the observed vehicle within the sequence of images.

14. The vehicle navigation system of claim 10, wherein the processor is further configured with processor-executable instructions to determine an angle of turn of the observed vehicle based on image processing of a front wheel and a rear wheel of the observed vehicle within the sequence of images.

15. The vehicle navigation system of claim 14, wherein the processor is further configured with processor-executable instructions to:

perform image processing on at least one image to identify the front wheel and the rear wheel of the observed vehicle;

perform image processing on at least one image to determine a relative angle of the front wheel with respect to the camera;

perform image processing on at least one image to determine a relative angle of the rear wheel with respect to the camera;

perform image processing on at least one image to determine a distance between the front wheel and the rear wheel; and determine a rate of turn of the observed vehicle based on the distance between the front wheel and the rear wheel, a linear speed of the observed vehicle based on the determined rate of rotation, and a difference between the relative angle of the front wheel and the relative angle of the rear wheel.

16. A processing device for use in a vehicle, the processing device configured to:

receive a sequence of images from a camera on the vehicle configured to obtain images external to the vehicle;

perform image processing to identify a wheel of an observed vehicle within the sequence of images; and
determine a rate of rotation of the wheel based on changes in orientation of the wheel between at least two images within the sequence of images, comprising:
identifying a feature of the wheel present in a first image of the wheel and a second image of the wheel;
performing image processing to identify a center of the wheel in each of the first and second images of the wheel;
determining an amount of positional change of the identified feature of the wheel between the first and second images of the wheel;
determining an angle of rotation of the identified feature of the wheel between the first and second images of the wheel based on the amount of positional change of the identified feature of the wheel between the first and second images of the wheel and the center of the wheel in each of the first and second images of the wheel;
determining an amount of time elapsed between the first image and the second image; and
determining the rate of rotation of the wheel based on the determining the angle of rotation of the identified feature and the amount of time elapsed between the first and second images of the wheel.

17. The processing device of claim 16, wherein the processing device is further configured to:
perform image processing to determine a diameter of the wheel; and
determine a speed of the observed vehicle based on the determined rate of rotation of the wheel and the diameter of the wheel.

18. A processing device for use in a vehicle, the processing device configured to:
receive a sequence of images from a camera on the vehicle configured to obtain images external to the vehicle;
perform image processing to identify a wheel of an observed vehicle within the sequence of images; and
determine a direction of travel of the observed vehicle based on image processing of the wheel within the sequence of images, comprising:
performing image processing of at least one image to determine an observed horizontal diameter of the wheel;
performing image processing of at least one image to determine an observed vertical diameter of the wheel; and
determining a relative angle of the wheel with respect to the camera based at least upon a ratio of the observed horizontal diameter to the observed vertical diameter.

19. The processing device of claim 16, wherein the processing device is further configured to determine whether the observed vehicle is turning based on image processing of a front wheel and a rear wheel of the observed vehicle within the sequence of images.

20. The processing device of claim 16, wherein the processing device is further configured to determine an angle of turn of the observed vehicle based on image processing of a front wheel and a rear wheel of the observed vehicle within the sequence of images.

21. The processing device of claim 20, wherein the processing device is further configured to:

perform image processing on at least one image to identify the front wheel and the rear wheel of the observed vehicle;
perform image processing on at least one image to determine a relative angle of the front wheel with respect to the camera;
perform image processing on at least one image to determine a relative angle of the rear wheel with respect to the camera;
perform image processing on at least one image to determine a distance between the front wheel and the rear wheel; and
determine a rate of turn of the observed vehicle based on the distance between the front wheel and the rear wheel, a linear speed of the observed vehicle based on the determined rate of rotation, and a difference between the relative angle of the front wheel and the relative angle of the rear wheel.

22. A non-transitory, processor-readable medium having stored thereon processor-executable instructions configured to cause a processor of a vehicle navigation system to perform operations comprising:
capturing, by a camera, a sequence of images including an observed vehicle;
performing, by a processor, image processing to identify a wheel of the observed vehicle within the sequence of images; and
determining, by the processor, a rate of rotation of the wheel based on changes in orientation of the wheel between at least two images within the sequence of images, comprising:
performing image processing to identify a feature of the wheel present in a first image of the wheel and a second image of the wheel;
performing image processing to identify a center of the wheel in each of the first and second images of the wheel;
determining an amount of positional change of the identified feature of the wheel between the first and second images of the wheel;
determining an angle of rotation of the identified feature of the wheel between the first and second images of the wheel based on the amount of positional change of the identified feature of the wheel between the first and second images of the wheel and the center of the wheel in each of the first and second images of the wheel;
determining an amount of time elapsed between the first image and the second image; and
determining the rate of rotation of the wheel based on the determining the angle of rotation of the identified feature and the amount of time elapsed between the first and second images of the wheel.

23. The non-transitory, processor-readable medium of claim 22, wherein the stored processor-executable instructions are configured to cause a processor of a vehicle navigation system to perform operations further comprising:
performing image processing of at least one image to determining a diameter of the wheel; and
determining a speed of the observed vehicle based on the determined rate of rotation of the wheel and the diameter of the wheel.

24. The method of claim 4, wherein the determining the direction of travel of the observed vehicle based on image processing of the wheel within the sequence of images further comprises:

calculating the ratio of the observed horizontal diameter to the observed vertical diameter;

determining a viewing angle to the wheel from the camera capturing the sequence of images; and determining the relative angle of the wheel with respect to the camera based at least upon the determined viewing angle to the wheel from the camera.

25. The vehicle navigation system of claim 12, wherein the processor is further configured with processor-executable instructions to determine the direction of travel of the observed vehicle based on image processing of the wheel within the sequence of images by:

calculating the ratio of the observed horizontal diameter to the observed vertical diameter;

determining a viewing angle to the wheel from the camera capturing the sequence of images; and determining the relative angle of the wheel with respect to the camera based at least upon the determined viewing angle to the wheel from the camera.

26. The processing device of claim 18, wherein the processing device is further configured with processor-executable instructions to determine the direction of travel of the observed vehicle based on image processing of the wheel within the sequence of images by:

calculating the ratio of the observed horizontal diameter to the observed vertical diameter;

determining a viewing angle to the wheel from the camera capturing the sequence of images; and determining the relative angle of the wheel with respect to the camera based at least upon the determined viewing angle to the wheel from the camera.

* * * * *